United States Patent
Komaba et al.

(10) Patent No.: US 9,560,224 B2
(45) Date of Patent: Jan. 31, 2017

(54) REMOTE CONTROL DEVICE, REMOTE OPERATION DEVICE, SCREEN TRANSMISSION CONTROL METHOD, AND NON-TRANSITORY COMPUTER-READABLE RECORDING MEDIUM ENCODED WITH SCREEN DISPLAY CONTROL PROGRAM

(71) Applicant: Konica Minolta, Inc., Tokyo (JP)

(72) Inventors: Kenichi Komaba, Toyokawa (JP); Hideyuki Matsuda, Hirakata (JP); Kazuhiro Tomiyasu, Toyokawa (JP); Eiichi Narimatsu, Fuchu (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/529,591

(22) Filed: Oct. 31, 2014

(65) Prior Publication Data

US 2015/0163369 A1 Jun. 11, 2015

(30) Foreign Application Priority Data

Nov. 1, 2013 (JP) .................................. 2013-228759

(51) Int. Cl.
*G06F 15/00* (2006.01)
*G06F 3/12* (2006.01)
(Continued)

(52) U.S. Cl.
CPC ...... *H04N 1/00469* (2013.01); *H04N 1/00392* (2013.01); *H04N 1/00493* (2013.01);
(Continued)

(58) Field of Classification Search
CPC ............ H04N 1/00469; H04N 1/00493; H04N 1/00392; H04N 2201/0094; H04N 2201/0055
(Continued)

(56) References Cited

U.S. PATENT DOCUMENTS

| | | | |
|---|---|---|---|
| 8,466,968 B2 * | 6/2013 | Takagi et al. ............. | 348/207.11 |
| 2009/0235173 A1 * | 9/2009 | Ichihara ........................ | 715/733 |
| 2010/0268762 A1 * | 10/2010 | Pahlavan .............. | G06F 3/0485 |
| | | | 709/203 |

FOREIGN PATENT DOCUMENTS

| | | |
|---|---|---|
| JP | 6-59647 A | 3/1994 |
| JP | 8-289132 A | 11/1996 |

(Continued)

OTHER PUBLICATIONS

Notice of Ground of Rejection issued in the corresponding Japanese Patent Application No. 2013-228759, dated Aug. 19, 2015, with English translation.

*Primary Examiner* — Douglas Tran

(74) *Attorney, Agent, or Firm* — Cantor Colburn LLP

(57) ABSTRACT

A remote control device remotely controlled by a remote operation device includes an operation screen transmission portion to transmit an operation screen to the remote operation device; and a changed area decision portion to decide on an area in a second operation screen that is different from a first operation screen, as a changed area, in a stage before the operation screen transmission portion transmits the second operation screen subsequently to the first operation screen. The operation screen transmission portion includes a supplemental information transmission portion to transmit supplemental information including a command to display the changed area in full screen, together with the second operation screen.

28 Claims, 19 Drawing Sheets

(51) Int. Cl.
*G06K 1/00* (2006.01)
*H04N 1/00* (2006.01)

(52) U.S. Cl.
CPC ............... *H04N 2201/0055* (2013.01); *H04N 2201/0094* (2013.01)

(58) Field of Classification Search
USPC .............................. 358/1.1, 1.13, 1.15, 1.14
See application file for complete search history.

(56) References Cited

FOREIGN PATENT DOCUMENTS

| | | |
|---|---|---|
| JP | 2007-4819 A | 1/2007 |
| JP | 2007-293511 A | 11/2007 |
| JP | 2010-231291 A | 10/2010 |
| JP | 2011-204250 A | 10/2011 |

\* cited by examiner

F I G. 6
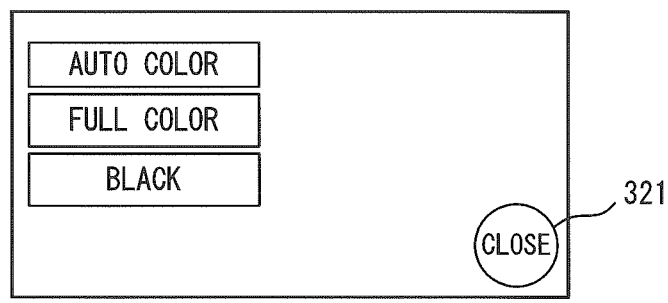

F I G. 8
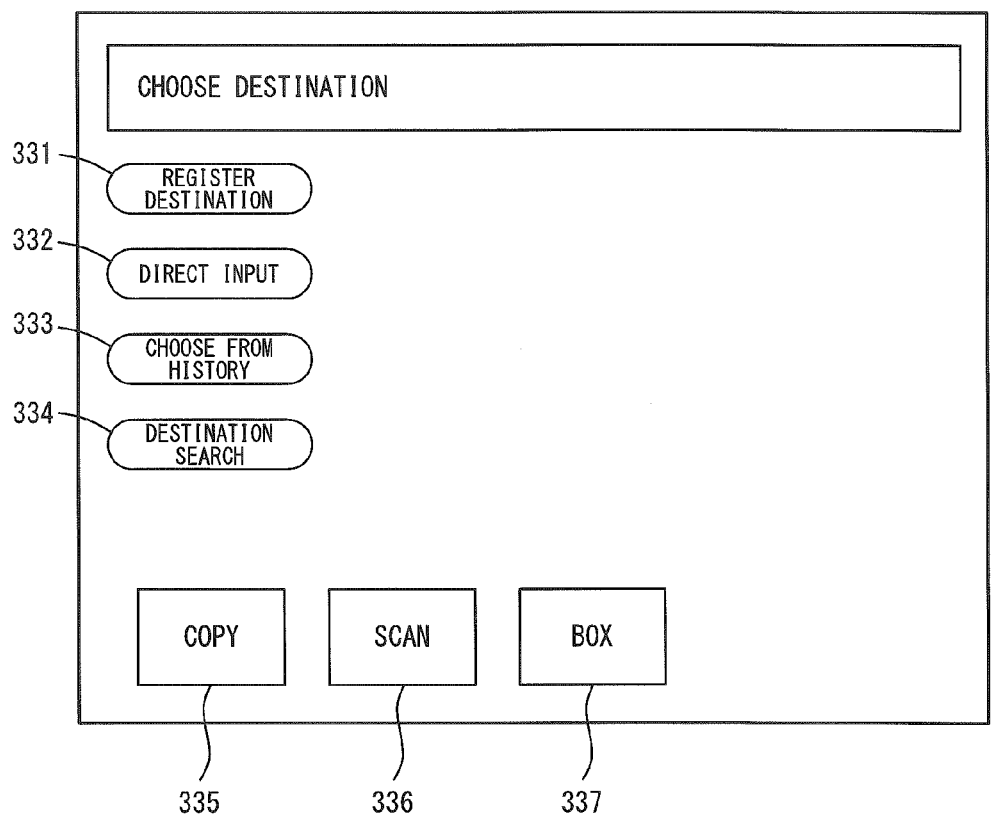

F I G. 9
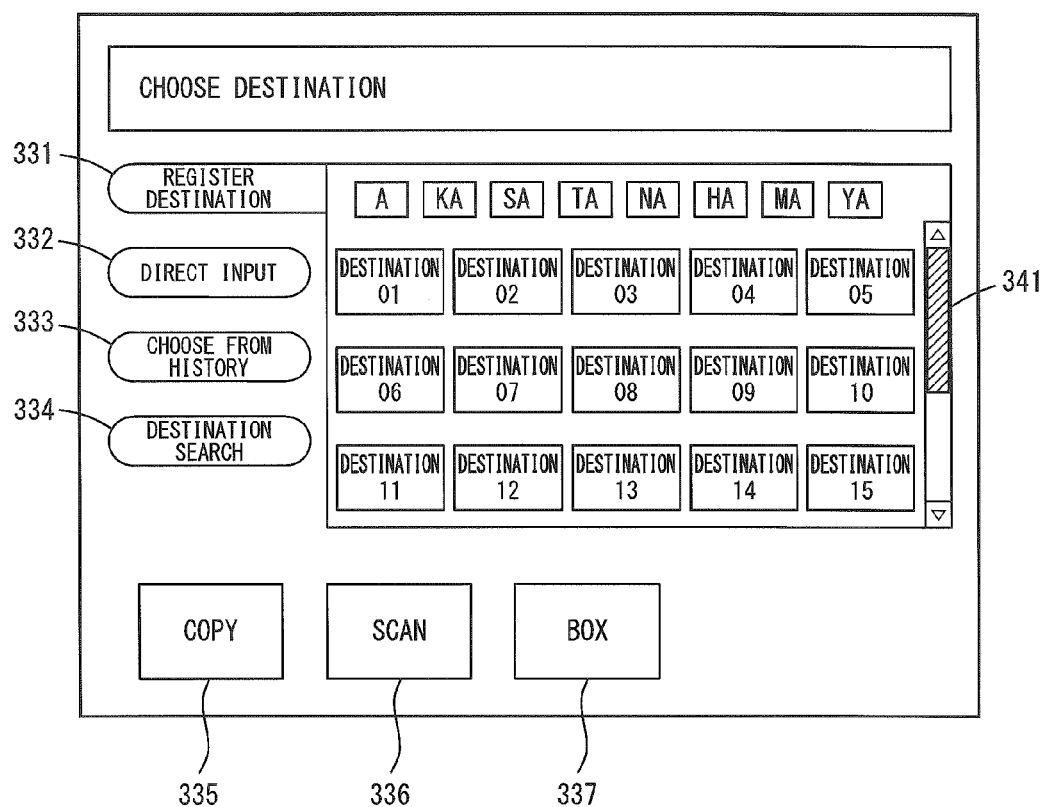

F I G. 10
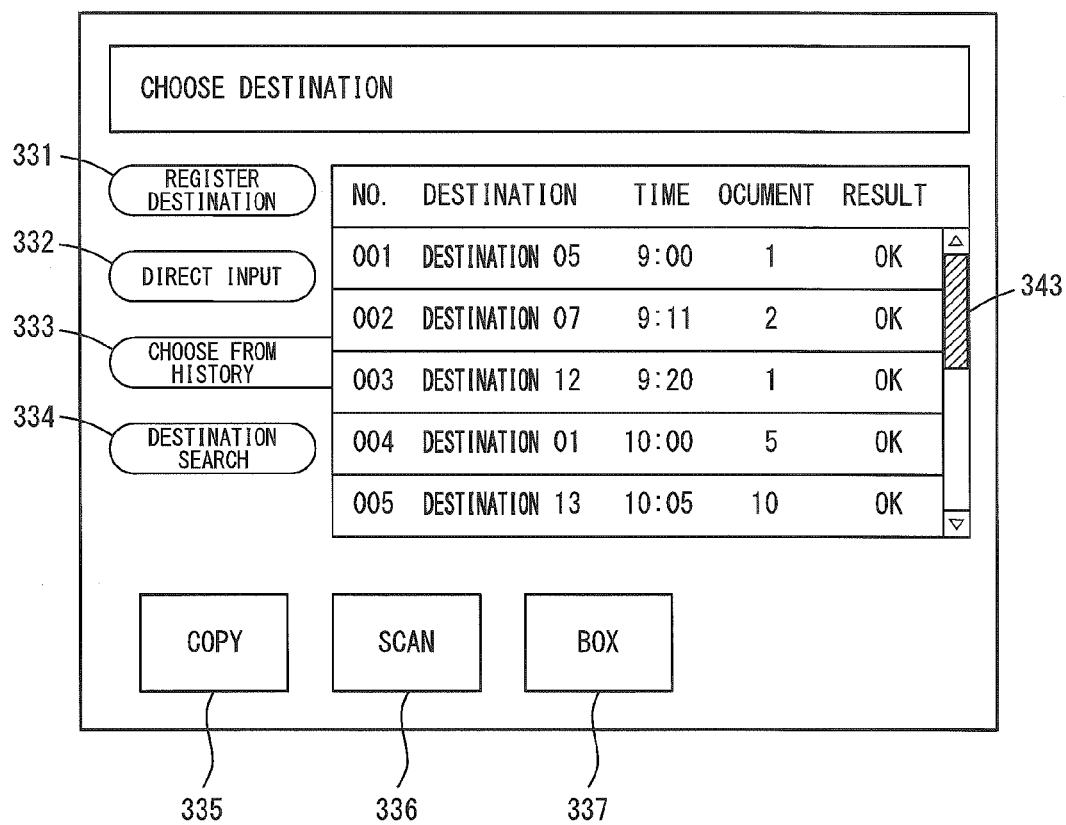

REMOTE CONTROL DEVICE, REMOTE OPERATION DEVICE, SCREEN TRANSMISSION CONTROL METHOD, AND NON-TRANSITORY COMPUTER-READABLE RECORDING MEDIUM ENCODED WITH SCREEN DISPLAY CONTROL PROGRAM

CROSS REFERENCE

This application is based on Japanese Patent Application No. 2013-228759 filed with Japan Patent Office on Nov. 1, 2013, the entire content of which is hereby incorporated by reference.

BACKGROUND OF THE INVENTION

1. Field of the Invention

The present invention relates to a remote control device remotely controlled by a remote operation device, a screen transmission control method and a screen transmission control program executed by the remote control device, a remote operation device remotely controlling a remote control device, and a screen display control method and a screen display control program executed by the remote operation device.

2. Description of the Related Art

Recent image forming apparatuses come up with touch panels. Touch panels facilitate the operation of enlarging, reducing, or scrolling a screen appearing on the display.

For example, Japanese Patent Laid-Open No. 2007-293511 discloses an input device with a touch panel which has a display screen for displaying an operation unit and detection means for detecting a touch on the display screen. The input device includes: state switching means for switching between a first state in which an operation on the operation unit appearing on the display screen is accepted if the detection means detects a touch on the display screen and a second state in which an operation for partially or entirely moving a display content on the display screen is accepted without accepting an operation on the operation unit; and a switching operation unit for accepting an operation of switching the states by the state switching means. In this device, when an input from a user is accepted using the touch panel, the display content on the display screen of the touch panel can be moved through a drag operation on the touch panel.

Image forming apparatuses can display, for example, a popup screen, a pull-down menu screen, and a balloon screen, which are superimposed on the currently displayed screen in order to enhance the user's operability. The size of the popup screen and other screens is often so small that the user has to make an operation of enlarging the area in order to view the content of the popup screen. A scroll operation is sometimes required in order to display the area of the popup screen. The operation is cumbersome accordingly.

SUMMARY OF THE INVENTION

According to an aspect of the present invention, a remote control device remotely controlled by a remote operation device includes: an operation screen transmission portion to transmit an operation screen to the remote operation device; and a changed area decision portion to decide on an area in a second operation screen that is different from a first operation screen, as a changed area, in a stage before the operation screen transmission portion transmits the second operation screen subsequently to the first operation screen. The operation screen transmission portion includes a supplemental information transmission portion to transmit supplemental information including a command to display the decided changed area in full screen, together with the second operation screen.

According to another aspect of the present invention, a remote operation device capable of remotely controlling a remote control device includes: an operation screen receiving portion to receive an operation screen from the remote control device; a display section decision portion to decide on at least part of the received operation screen as a display section to be displayed on a display unit; a display magnification decision portion to decide a display magnification, based on a size of the decided display section and a size of a display surface of the display unit; and a display control portion to display an image of the display section enlarged or reduced at the decided display magnification, on the display unit. The display section decision portion includes a changed section extraction portion to extract a changed section in a second operation screen that is different from a first operation screen if the operation screen receiving portion receives the second operation screen in a state in which the first operation screen is displayed on the display unit, and a first decision portion to decide on the changed section in the second operation screen as a display section to be displayed on the display unit if the changed section extraction portion extracts the changed section.

According to a further aspect of the present invention, a screen transmission control method is performed by a remote control device remotely controlled by a remote operation device. The method includes: an operation screen transmission step of transmitting an operation screen to the remote operation device; and a changed area decision step of deciding on an area in a second operation screen that is different from a first operation screen, as a changed area, in a stage before the second operation screen is transmitted subsequently to the first operation screen in the operation screen transmission step. The operation screen transmission step includes a supplemental information transmission step of, if a changed area is decided in the changed area decision step, transmitting supplemental information including changed area information indicating a size and a position of the decided changed area and a command to display the changed area in an enlarged size, together with the second operation screen.

According to a still further aspect of the present invention, a screen display control method is performed by a remote operation device remotely controlling a remote control device. The method includes: an operation screen receiving step of receiving an operation screen from the remote control device; a display section decision step of deciding on at least part of the received operation screen as a display section to be displayed on a display unit; a display magnification decision step of deciding a display magnification, based on a size of the decided display section and a size of a display surface of the display unit; and a display control step of displaying an image of the display section enlarged or reduced at the decided display magnification, on the display unit. The display section decision step includes a changed section extraction step of extracting a changed section in a second operation screen that is different from a first operation screen if the second operation screen is received in the operation screen receiving step in a state in which the first operation screen is displayed on the display unit, and a first decision step of deciding on the changed section in the second operation screen as a display section to be displayed on the display unit if the changed section is extracted in the changed section extraction step.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 6 is a first diagram showing an example of a sub screen.

FIG. 8 is a diagram showing an example of a specific basic screen.

FIG. 9 is a second diagram showing an example of the composite screen.

FIG. 10 is a third diagram showing an example of the composite screen.

DESCRIPTION OF THE PREFERRED EMBODIMENTS

Embodiments of the present invention will be described below with reference to the figures. In the following description, the same parts are denoted with the same reference signs. Their names and functions are also the same, and a detailed description thereof will not be repeated.

First Embodiment

Figure 1:
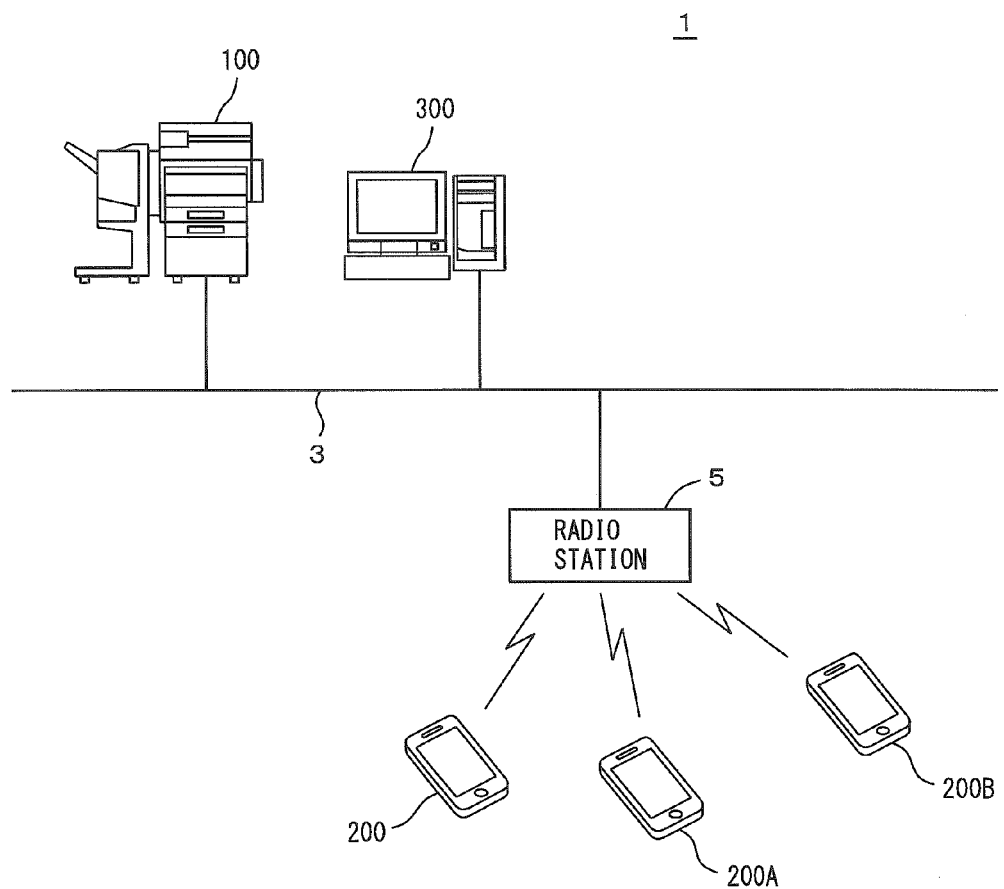
FIG. 1 is a diagram showing an example of the overview of a remote control system in an embodiment of the present invention.

FIG. 1 is a diagram showing an example of the overview of a remote control system in an embodiment of the present invention. Referring to FIG. 1, remote control system 1 includes a Multi Function Peripheral (hereinafter referred to as "MFP") 100 functioning as an image control apparatus, a personal computer (hereinafter referred to as "PC") 300, a radio station 5, and portable information devices 200, 200A, 200B functioning as remote operation devices. MFP 100, radio station 5, and PC 300 are connected to a network 3. Portable information devices 200, 200A, 200B are connected to network 3 through radio station 5.

Network 3 is a Local Area Network (LAN), either wired or wireless. Network 3 is not limited to a LAN but may be a Wide Area Network (WAN), a Public Switched Telephone Network (PSTN), or the Internet.

PC 300 is a general computer. PC 300 is installed with a printer driver program compatible with MFP 100 and executes the printer driver program to control MFP 100 so that MFP 100 executes an image forming process, a document scan process, and other processes.

Portable information devices 200, 200A, 200B are computers such as smart phones and PDAs (Personal Digital Assistants) carried and used by users. Portable information devices 200, 200A, 200B have the same hardware configuration and functions, and portable information device 200 will be taken as an example in the description here, unless otherwise specified. Here, portable information device 200 is a smart phone and has a wireless LAN function and a call function. Portable information device 200 thereby can connect to a mobile phone network to make a call by communicating with a mobile phone base station by radio.

In remote control system 1 in the present embodiment, portable information device 200 is installed with a remote operation program for remotely controlling MFP 100 and functions as a remote operation device for remotely controlling MFP 100. When a remote operation is input by the user who operates portable information device 200, portable information device 200 transmits a remote control command to MFP 100. MFP 100 is installed with a remote control program for receiving a remote control command from portable information device 200 and executing a process in accordance with the received remote control command. In the present embodiment, a remote operation program for remotely controlling MFP 100 is installed in portable information device 200, by way of example. However, the remote operation program for remotely controlling MFP 100 may be installed in PC 300. In this case, the user can remotely control MFP 100 using PC 300 in the same manner as when remotely controlling MFP 100 using portable information device 200.

Figure 2:
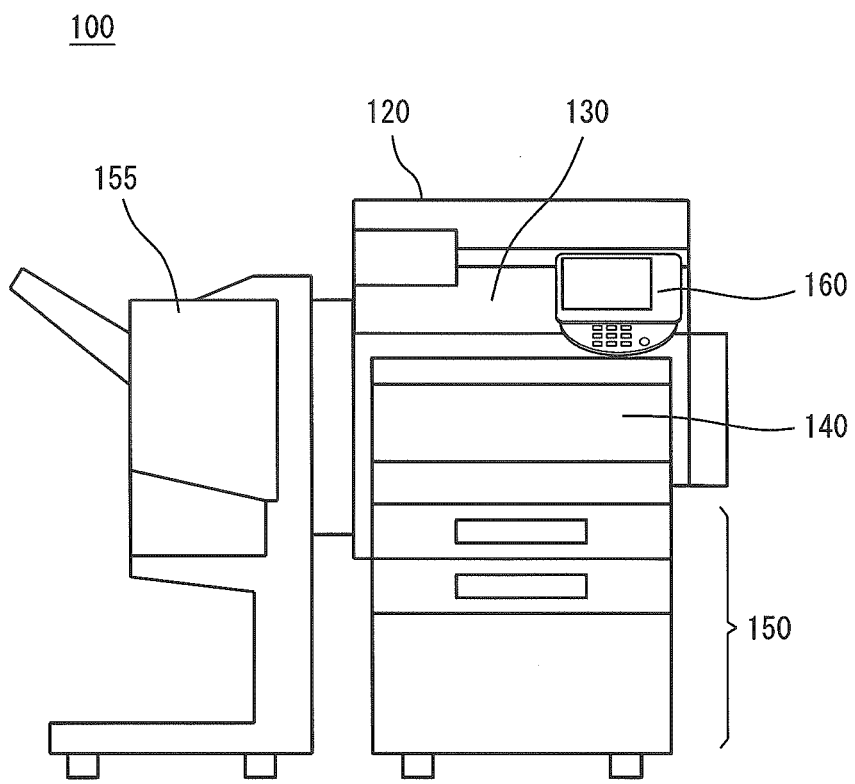
FIG. 2 is an external perspective view of an MFP.
Figure 3:
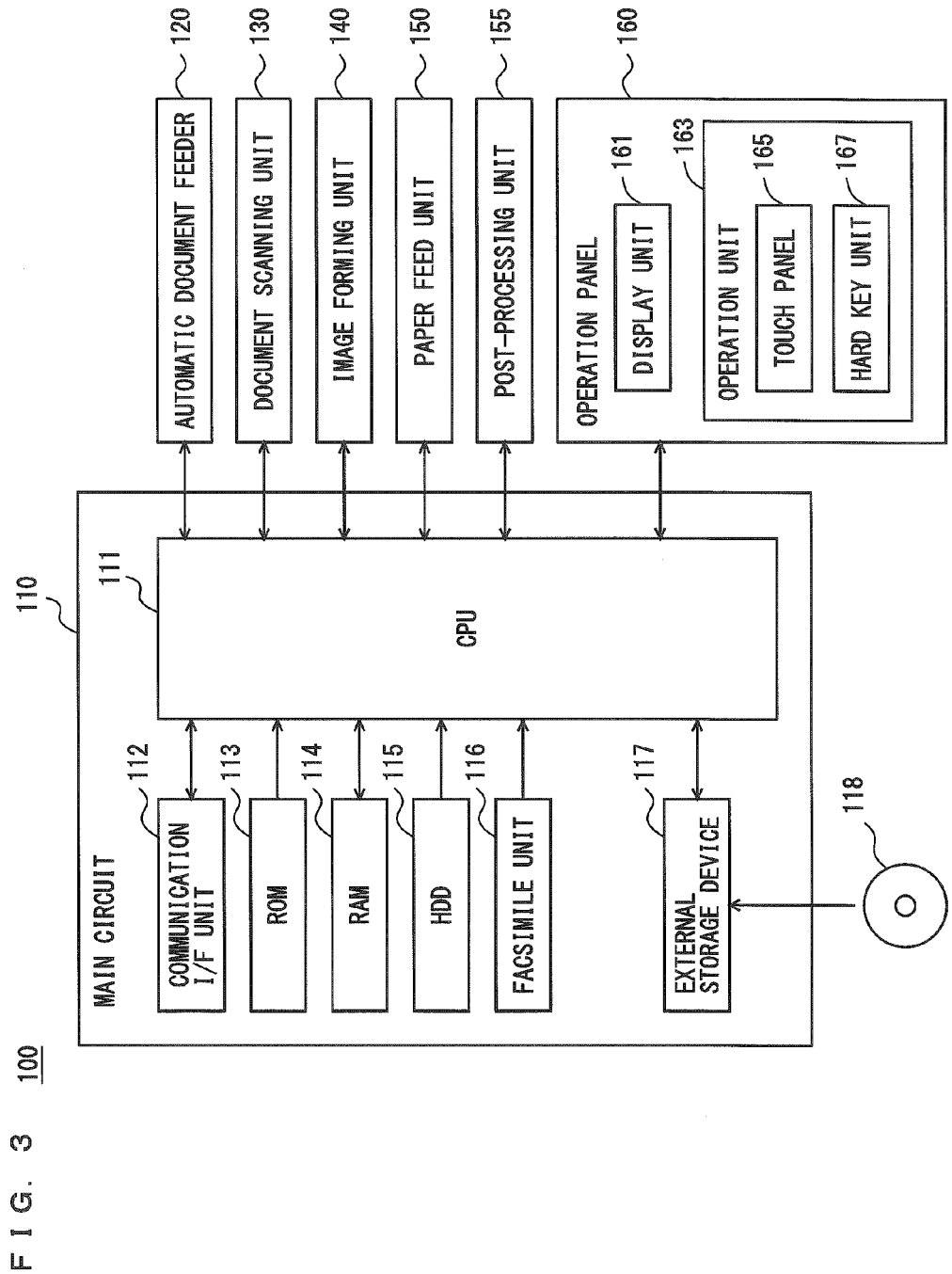
FIG. 3 is a block diagram showing the overview of an exemplary hardware configuration of the MFP.

FIG. 2 is an external perspective view of the MFP. FIG. 3 is a block diagram showing the overview of an exemplary hardware configuration of the MFP. Referring to FIG. 2 and FIG. 3, MFP 100 includes a main circuit 110, a document scanning unit 130 for scanning a document, an automatic document feeder 120 for conveying a document to document scanning unit 130, an image forming unit 140 for forming an image on paper based on image data output by document scanning unit 130 scanning a document, a paper feed unit 150 for supplying paper to image forming unit 140, a post-processing unit 155 for processing paper having an image formed thereon, and an operation panel 160 as a user interface.

Post-processing unit 155 executes a sorting process of sorting one or more sheets of paper having an image formed thereon by image forming unit 140 and discharging the sorted paper, a punching process of forming punch holes, and a stapling process of stapling paper.

Main circuit 110 includes a Central Processing Circuit (CPU) 111, a communication interface (I/F) unit 112, a ROM 113, a RAM 114, a Hard Disk Drive (HDD) 115 as a mass storage device, a facsimile unit 116, and an external storage device 117 to which a CD-ROM 118 is attached. CPU 111 is connected to automatic document feeder 120, document scanning unit 130, image forming unit 140, paper feed unit 150, post-processing unit 155, and operation panel 160 to centrally control MFP 100.

ROM 113 stores a program executed by CPU 111 or data necessary to execute the program. RAM 114 is used as a work area when CPU 111 executes a program. RAM 114 includes a setting value storage area and a setting screen storage area. The setting value storage area is an area for storing a setting value for executing a process. The setting screen storage area is an area for storing a setting screen displayed on display unit 161. RAM 114 temporarily stores scan data (image data) successively sent from document scanning unit 130.

Operation panel 160 is provided on the top surface of MFP 100 and includes a display unit 161 and an operation unit 163. Display unit 161 is a display device such as an LCD (Liquid Crystal Display) or an organic ELD (Electro-Luminescence Display) and displays instruction menus to users, information about the acquired image data, and other information. Operation unit 163 includes a hard key unit 167 including a plurality of keys and accepts input of a variety of instructions and data such as characters and numerals through the user's operation corresponding to the keys. Operation unit 163 further includes a touch panel 165 provided on display unit 161.

Communication I/F unit 112 is an interface for connecting MFP 100 to network 3. CPU 111 communicates with PC 300 or portable information device 200, 200A, 200B through communication I/F unit 112 to transmit/receive data. Communication I/F unit 112 can also communicate with a computer connected to the Internet through network 3.

Facsimile unit 116 is connected to a PSTN to transmit facsimile data to the PSTN or receive facsimile data from the PSTN. Facsimile unit 116 stores the received facsimile data into HDD 115 or outputs it to image forming unit 140. Image forming unit 140 prints the facsimile data received from facsimile unit 116 on paper. Facsimile unit 116 also converts data stored in HDD 115 into facsimile data and transmits the converted facsimile data to a facsimile machine connected to the PSTN.

CD-ROM (Compact Disk ROM) 118 is attached to external storage device 117. CPU 111 can access CD-ROM 118 through external storage device 117. CPU 111 loads the program recorded on CD-ROM 118 attached to external storage device 117 into RAM 114 for execution. The program executed by CPU 111 can be stored not only in CD-ROM 118 but also in other media such as an optical disk (MO (Magnetic Optical Disc)/MD (Mini Disc)/DVD (Digital Versatile Disc)), an IC card, an optical card, and a semiconductor memory such as a mask ROM, an EPROM (Erasable Programmable ROM), and an EEPROM (Electrically EPROM).

The program executed by CPU 111 is not limited to a program recorded on CD-ROM 118. A program stored in HDD 115 may be loaded into RAM 114 for execution. In this case, another computer connected to network 3 may overwrite the program stored in HDD 115 of MFP 100 or additionally write a new program. MFP 100 may download a program from another computer connected to network 3 and store the program into HDD 115. The program referred to here includes not only a program directly executable by CPU 111 but also a source program, a compressed program, and an encrypted program.

Figure 4:
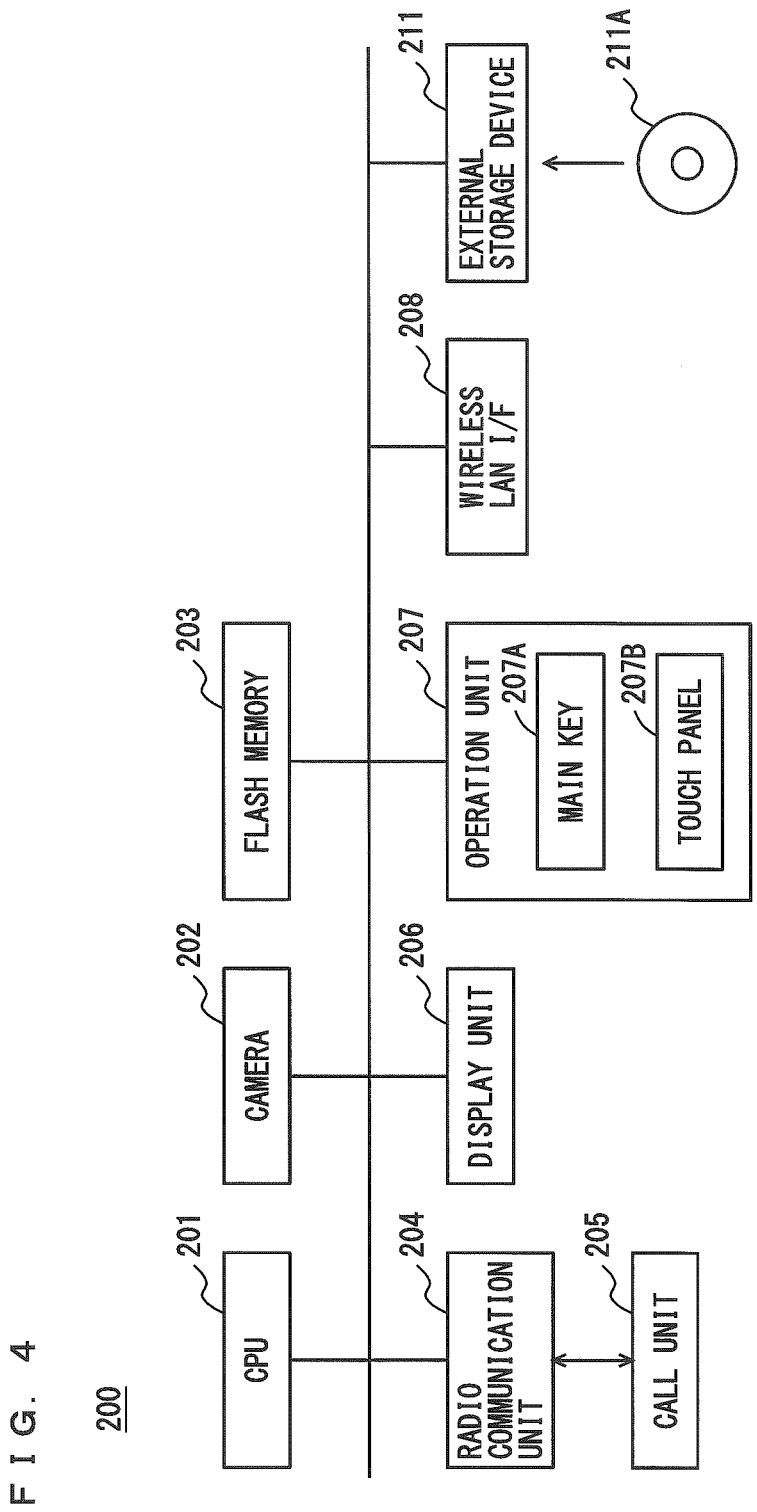
FIG. 4 is a block diagram showing the overview of an exemplary hardware configuration of a portable information device.

FIG. 4 is a block diagram showing the overview of an exemplary hardware configuration of the portable information device. Referring to FIG. 4, portable information device 200 in the present embodiment includes a CPU 201 for centrally controlling portable information device 200, a camera 202, a flash memory 203 for storing data in a nonvolatile manner, a radio communication unit 204 connected to a call unit 205, a display unit 206 displaying information, an operation unit 207 accepting the user's operation, a wireless LAN I/F 208, and an external storage device 211.

Display unit 206 is a display device such as an LCD or an organic ELD and displays instruction menus to users, information about the acquired image data, and other information. Operation unit 207 includes a main key 207A and a touch panel 207B. When the user points on the display surface of display unit 206, operation unit 207 outputs the position in the display surface detected by touch panel 207B to CPU 201. Touch panel 207B is provided on the upper surface or the lower surface of the display unit 206 and outputs the coordinates of the position pointed by the user to CPU 201. Touch panel 207B detects the position designated by the operating user with a finger or a stylus and outputs the coordinates of the detected position to CPU 201. Touch panel 207B is a multi-touch touch panel. When the user inputs a multi-touch operation, touch panel 207B outputs a plurality of coordinates corresponding to a plurality of positions simultaneously designated by the user to CPU 201. When the user inputs a single touch operation, touch panel 207B outputs the coordinates corresponding to the single position designated by the user to CPU 201.

CPU 201 detects the position designated by the user in the screen appearing on display unit 206, based on the position detected by touch panel 207B. CPU 201 accepts input of a variety of instructions and data such as characters and numerals through the user's operation, based on the screen appearing on display unit 206 and the position detected by touch panel 207B. For example, when a screen including a ten-key image appears on display unit 206, a numeral corresponding to the key displayed at the position detected by touch panel 207B is accepted.

Camera 202 includes a lens and an optoelectronic transducer, and light collected by the lens is imaged on the optoelectronic transducer. The optoelectronic transducer transduces the received light and outputs image data to CPU 201. Examples of the optoelectronic transducer include a CMOS (Complementary Metal Oxide Semiconductor) sensor and a CCD (Charge Coupled Device) sensor.

Radio communication unit 204 communicates by radio with a mobile phone base station connected to a telephone communication network. Radio communication unit 204 connects portable information device 200 to the telephone communication network to enable a call using call unit 205. Radio communication unit 204 decodes a voice signal obtained by demodulating a radio signal received from a mobile phone base station and outputs the decoded signal to call unit 205. Radio communication unit 204 encodes voice input from call unit 205 and transmits the encoded signal to a mobile phone base station. Call unit 205 includes a microphone and a speaker. Voice input from radio communication unit 204 is output from the speaker, and voice input from the microphone is output to radio communication unit 204. Radio communication unit 204 is controlled by CPU 201 and connects portable information device 200 to an email server to transmit/receive an email.

Wireless LAN I/F 208 is an interface which communicates with radio station 5 to connect portable information device 200 to network 3. The respective IP (Internet Protocol) addresses of PC 300 and MFP 100 are registered in portable information device 200, so that portable information device 200 can communication with PC 300 and MFP 100 to transmit/receive data. In the present embodiment, portable information device 200 uses wireless LAN I/F 208 to communication with PC 300 and MFP 100, by way of example. However, any other communication scheme may be used to communicate with them. Specifically, in a case where portable information device 200, PC 300, and MFP 100 are installed with a near field communication device, for example, such as Bluetooth (registered trademark), portable information device 200 may perform one-to-one communication with PC 300 or MFP 100.

Flash memory 203 stores a program executed by CPU 201 or data necessary to execute the program. CPU 201 loads the program recorded in flash memory 203 into the RAM of CPU 201 for execution.

External storage device 211 is removable from portable information device 200. A CD-ROM 211A encoded with a remote operation program can be attached. CPU 201 can access CD-ROM 211A through external storage device 211. CPU 201 can load the remote operation program recorded on CD-ROM 211A attached to external storage device 211 into the RAM of CPU 201 for execution.

The program recorded in flash memory 203 or CD-ROM 211A has been described as a program executed by CPU 201. However, another computer connected to network 3 may overwrite the program stored in flash memory 203 or additionally write a new program. Portable information device 200 may download a program from another computer connected to network 3. The program referred to here includes not only a program directly executable by CPU 201 but also a source program, a compressed program, and an encrypted program.

The program executed by CPU 201 may be stored not only in CD-ROM 211A but also in other media such as an optical disk (MO/MD/DVD), an IC card, an optical card, and a semiconductor memory such as a mask ROM, an EPROM, and an EEPROM.

MFP 100 stores a basic screen and a sub screen corresponding to each of a plurality of operation screens in HDD 115 in advance. The operation screens include a basic screen and a composite screen in which a sub screen is superimposed on a basic screen. A plurality of basic screens corresponding to a plurality of operation screens are each associated with one or more other basic screens and form a hierarchical structure. Each basic screen includes a button for inputting an instruction to switch display to another basic screen to allow the user to switch the basic screen to another basic screen, and the button is associated with another basic screen. In a basic screen, the button for accepting an operation for switching to another basic screen associated with the basic screen is hereinafter referred to as a transition button.

Some basic screens include, for example, a superimposed button as an area associated with a sub screen. Sub screens include a popup screen, a pull-down menu screen, and a balloon screen. Sub screens also include a fixed screen including predetermined information and a variable screen including information not fixed in advance. Examples of the fixed screen include a menu screen and a setting screen for setting a setting value. Examples of the variable screen include a history display screen for displaying job history and an address display screen for displaying an address book. The variable screen defines a screen size, information for arranging data, and the like.

Figure 5:
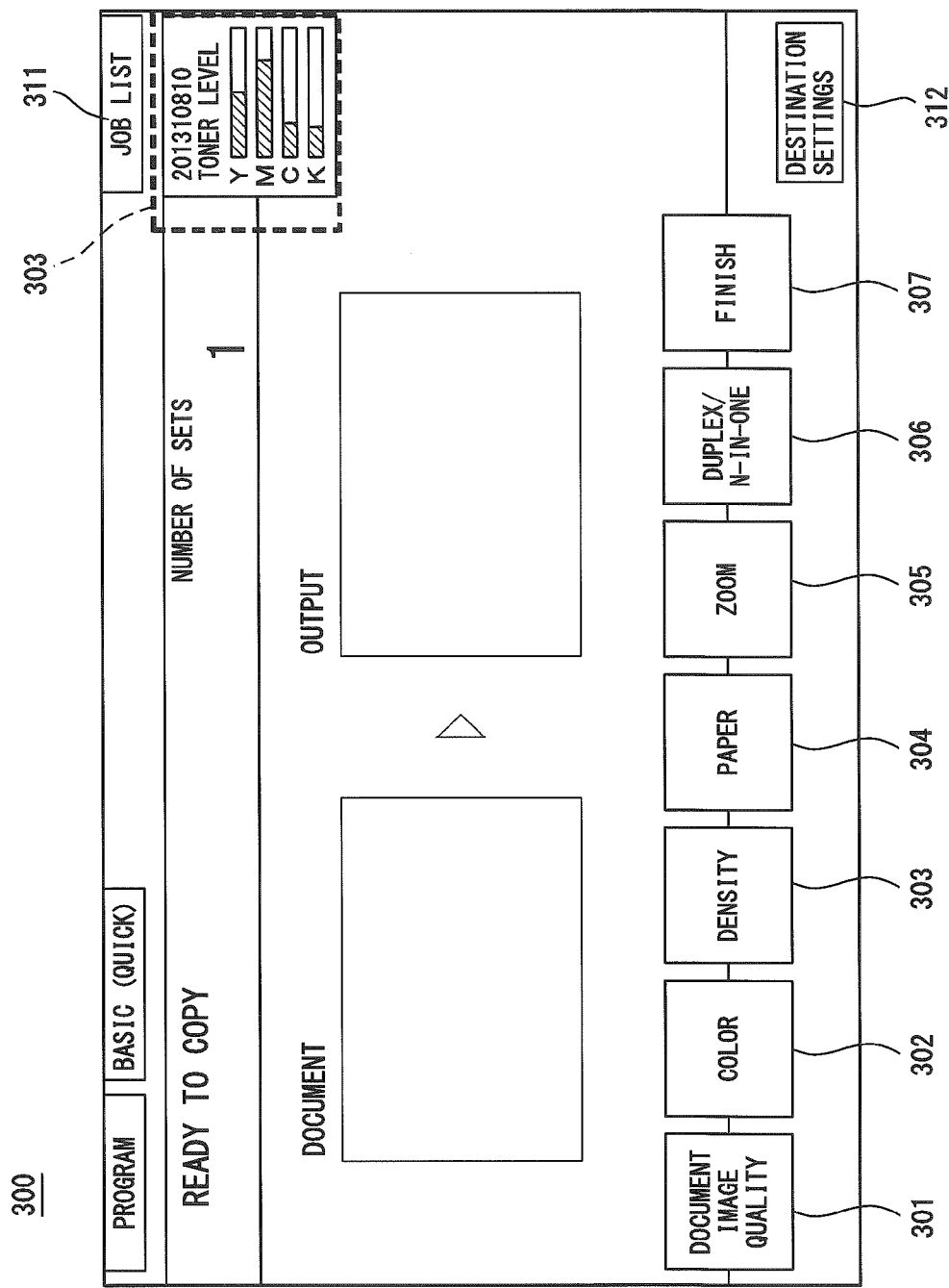
FIG. 5 is a first diagram showing an example of a basic screen.

FIG. 5 is a first diagram showing an example of the basic screen. Referring to FIG. 5, basic screen 300 includes superimposed buttons 301 to 307 and transition buttons 311, 312.

FIG. 6 is a first diagram showing an example of the sub screen. Sub screen 320 shown in FIG. 6 is a balloon screen associated with superimposed button 302 included in basic screen 300 shown in FIG. 5. Referring to FIG. 6, sub screen 320 includes, as a menu for setting the color used in image forming, a button labeled with "AUTO COLOR", a button labeled with "FULL COLOR", a button labeled with "BLACK", and a CLOSE button 321 associated with a command to close the sub screen.

Figure 7:
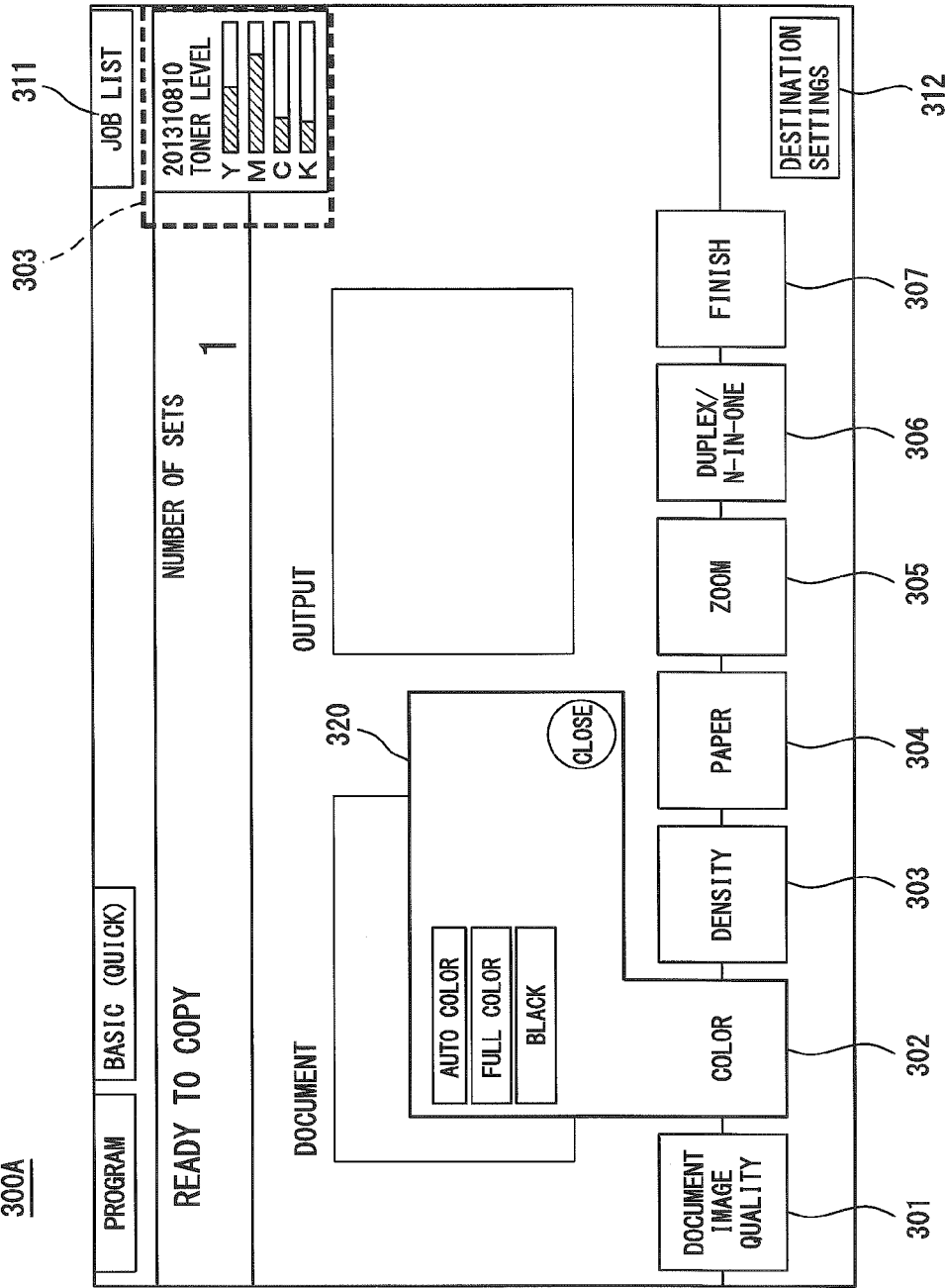
FIG. 7 is a first diagram showing an example of a composite screen.

FIG. 7 is a first diagram showing an example of the composite screen. The composite screen shown in FIG. 7 is a screen appearing when superimposed button 302 is designated in basic screen 300 shown in FIG. 5. Referring to FIG. 7, composite screen 300A is a screen in which basic screen 300 shown in FIG. 5 is combined with sub screen 320 shown in FIG. 6. Sub screen 320 is arranged with reference to the position of superimposed button 302. When CLOSE button 321 included in sub screen 320 is designated in composite screen 300A, the basic screen shown in FIG. 5 appears.

Basic screens further include a specific basic screen that is not displayed alone but is displayed in combination with a sub screen. The specific basic screen has one sub screen set by default among a plurality of sub screens that can be superimposed on basic screens.

FIG. 8 is a diagram showing an example of the specific basic screen. The specific basic screen shown in FIG. 8 is a basic screen associated with transition button 312 included in the basic screen shown in FIG. 5. Referring to FIG. 8, specific basic screen 330 includes superimposed buttons 331 to 334 and transition buttons 335 to 337. Specific basic screen 330 is associated with a sub screen associated with superimposed button 331 as a default sub screen.

FIG. 9 is a second diagram showing an example of the composite screen. The composite screen shown in FIG. 9 is a screen appearing when transition button 312 included in the basic screen shown in FIG. 5 is designated. Referring to FIG. 9, composite screen 330A is a screen in which specific basic screen 330 shown in FIG. 8 is combined with sub screen 341. Sub screen 341 is arranged with reference to the position of superimposed button 331. Sub screen 341 is a variable screen generated based on the address book stored in HDD 115. When one of superimposed buttons 332 to 334 other than superimposed button 331 is designated in composite screen 330A, a composite screen appears, which displays the sub screen associated with the designated superimposed button in place of sub screen 341.

FIG. 10 is a third diagram showing an example of the composite screen. Composite screen 340 shown in FIG. 10 is a screen appearing when superimposed button 333 shown in composite screen 330A shown in FIG. 9 is designated. Referring to FIG. 10, composite screen 340 is a screen in which specific basic screen 330 shown in FIG. 8 is combined with a sub screen 343. Sub screen 343 is arranged with reference to the position of superimposed button 333. Sub screen 343 is a variable screen generated based on history data stored in HDD 115.

Figure 11:
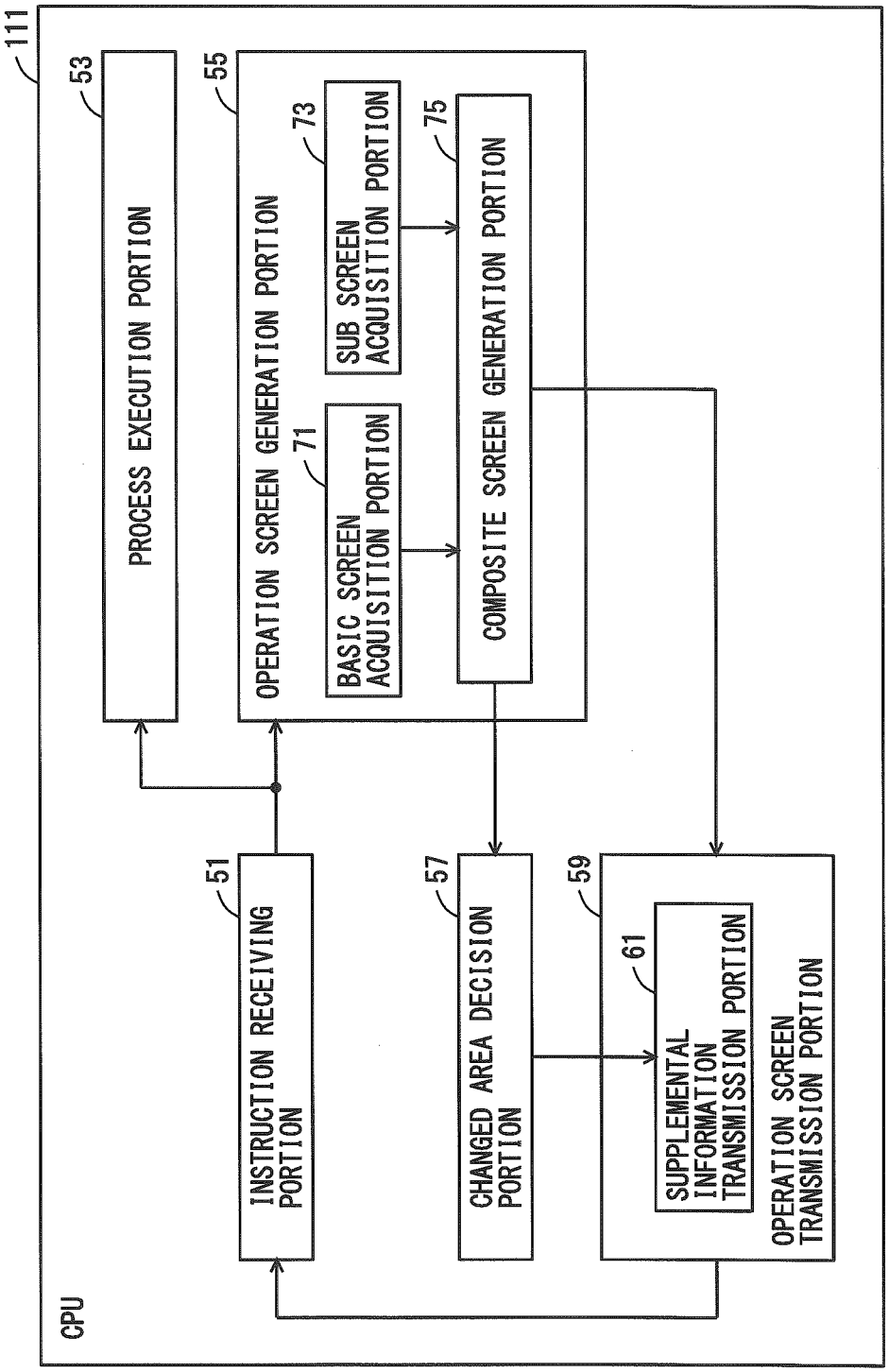
FIG. 11 is a block diagram showing an example of functions of the CPU of the MFP in the first embodiment.

FIG. 11 is a block diagram showing an example of functions of the CPU of the MFP in the first embodiment.

The functions shown in FIG. 11 are formed in CPU 111 by CPU 111 of the MFP 100 executing a screen transmission control program stored in ROM 113, HDD 115, or CD-ROM 118. Referring to FIG. 11, CPU 111 includes an instruction receiving portion 51, a process execution portion 53, an operation screen generation portion 55, a changed area decision portion 57, and an operation screen transmission portion 59.

Instruction receiving portion 51 controls communication I/F unit 112 and establishes communication with portable information device 200 when a connection request is received from portable information device 200. In response to communication being established with portable information device 200, instruction receiving portion 51 outputs an initial screen transmission instruction to operation screen generation portion 55.

When an initial screen transmission instruction is input from instruction receiving portion 51, operation screen generation portion 55 reads out a predetermined operation screen from among a plurality of operation screens stored in HDD 115 and outputs the read operation screen to operation screen transmission portion 59. The operation screen set as an initial screen is a basic screen.

In response to input of an operation screen from operation screen generation portion 55, operation screen transmission portion 59 transmits the input operation screen to portable information device 200 that has transmitted a connection request, and outputs the operation screen to instruction receiving portion 51 and changed area decision portion 57. Operation screen transmission portion 59 includes a supplemental information transmission portion 61. The details of supplemental information transmission portion 61 will be described later.

At portable information device 200, the operation screen received from MFP 100 appears on display unit 206. If the user of portable information device 200 designates a given position in the operation screen appearing on display unit 206, for example, with a finger, portable information device 200 transmits positional information indicating the position designated by the user in the operation screen to MFP 100.

When operation screen transmission portion 59 transmits an operation screen to portable information device 200, instruction receiving portion 51 receives the operation screen transmitted to portable information device 200 from operation screen transmission portion 59. If communication I/F unit 112 receives positional information from portable information device 200 after operation screen transmission portion 59 transmits an operation screen to portable information device 200, instruction receiving portion 51 specifies an instruction by the user based on the last operation screen input from operation screen transmission portion 59 and the positional information received from portable information device 200. The positional information received from portable information device 200 indicates a position in the operation screen input from operation screen transmission portion 59.

Specifically, if the position specified by the positional information in the operation screen is within a transition button, instruction receiving portion 51 specifies a first instruction to display an operation screen including another basic screen. If a first instruction is specified, instruction receiving portion 51 outputs, to operation screen generation portion 55, the first instruction including basic screen identification information for identifying the basic screen associated with the transition button present at the position specified by the positional information in the operation screen.

If the position specified by the positional information in the operation screen is within a superimposed button, instruction receiving portion 51 specifies a second instruction to display a composite screen in which a basic screen is combined with a new sub screen. If a second instruction is specified, instruction receiving portion 51 outputs, to operation screen generation portion 55, the second instruction including basic screen identification information for identifying the basic screen included in the operation screen and sub screen identification information for identifying the sub screen associated with the transition button preset at the position specified by the positional information in the operation screen.

If the position specified by the positional information in the operation screen is within a button to which a command to execute a process is allocated, instruction receiving portion 51 specifies a third instruction. If a third instruction is specified, instruction receiving portion 51 outputs, to process execution portion 53, the command allocated to the button present at the position specified by the positional information in the operation screen.

If the position specified by the positional information in the operation screen is within a button to which a command to close the sub screen is allocated, instruction receiving portion 51 specifies a fourth instruction to close the sub screen. If a fourth instruction is specified, instruction receiving portion 51 outputs, to operation screen generation portion 55, the fourth instruction including basic screen identification information for identifying the basic screen included in the operation screen.

Operation screen generation portion 55 includes a basic screen acquisition portion 71, a sub screen acquisition portion 73, and a composite screen generation portion 75. When a first instruction, a second instruction or a fourth instruction is input from instruction receiving portion 51, basic screen acquisition portion 71 reads out the basic screen specified by the basic screen identification information included in the first instruction, the second instruction, or the fourth instruction input from instruction receiving portion 51, from HDD 115 and outputs the read basic screen to composite screen generation portion 75.

When a second instruction is specified, sub screen acquisition portion 73 reads out the sub screen specified by the sub screen identification information included in the second instruction, from HDD 115 and outputs the read sub screen to composite screen generation portion 75. When a first instruction is specified, if the basic screen specified by the basic screen identification information included in the first instruction is a specific basic screen, sub screen acquisition portion 73 reads out the sub screen set for the specific basic screen by default, from HDD 115 and outputs the read sub screen to composite screen generation portion 75. If the sub screen is a variable screen, sub screen acquisition portion 73 generates a content in accordance with the screen size included in the sub screen, information for arranging data, and the like, and then generates a sub screen including the content.

When a first instruction is input from instruction receiving portion 51, composite screen generation portion 75 may receive a sub screen or may not receive a sub screen from sub screen acquisition portion 73. If a first instruction is input from instruction receiving portion 51 and a sub screen is input from sub screen acquisition portion 73, composite screen generation portion 75 generates a composite screen by superimposing an image of the sub screen input from sub screen acquisition portion 73 on an image of the basic screen input from basic screen acquisition portion 71, and outputs the generated composite screen as an operation screen to operation screen transmission portion 59 and changed area decision portion 57. If a first instruction is input from instruction receiving portion 51 and a sub screen is not input from sub screen acquisition portion 73, composite screen generation portion 75 outputs the basic screen input from basic screen acquisition portion 71 as an operation screen to operation screen transmission portion 59 and changed area decision portion 57.

When a second instruction is input from instruction receiving portion 51, composite screen generation portion 75 generates a composite screen by superimposing an image of the sub screen input from sub screen acquisition portion 73 on an image of the basic screen input from basic screen acquisition portion 71, and outputs the generated composite screen as an operation screen to operation screen transmission portion 59 and changed area decision portion 57.

When a fourth instruction is input from instruction receiving portion 51, composite screen generation portion 75 outputs the basic screen input from basic screen acquisition portion 71 as an operation screen to operation screen transmission portion 59 and changed area decision portion 57.

Changed area decision portion 57 receives an operation screen transmitted to portable information device 200 from operation screen transmission portion 59 and receives an operation screen from composite screen generation portion 75. Here, the operation screen input from operation screen transmission portion 59 is referred to as the first operation screen, and the operation screen input from composite screen generation portion 75 is referred to as the second operation screen. The first operation screen is an operation screen transmitted to portable information device 200 and displayed by portable information device 200. The second operation screen is an operation screen to be transmitted to portable information device 200 subsequently to the first operation screen.

When the second operation screen is a composite screen, changed area decision portion 57 decides on the area of the sub screen in the second operation screen as a changed area. Changed area decision portion 57 therefore decides on the area of the sub screen in the second operation screen as a changed area when the first operation screen is a basic screen and the second operation screen is a composite screen in which a sub screen is superimposed on the first operation screen.

However, even when the second operation screen is a composite screen, if the basic screen of the first operation screen differs from the basic screen of the second operation screen, the entire second operation screen is decided as a changed area, rather than deciding on the area of the sub screen in the second operation screen as a changed area. For example, when the first operation screen is an operation screen in which a first specific basic screen is combined with a first sub screen and the second operation screen is an operation screen in which the first specific basic screen is combined with a second sub screen, the area of the sub screen in the second operation screen is decided as a changed area. On the other hand, when the first operation screen is an operation screen in which a first specific basic screen is combined with a first sub screen and the second operation screen is an operation screen in which a second specific basic screen different from the first specific basic screen is combined with a third sub screen, the area of the sub screen in the second operation screen is not decided as a changed area.

When the second operation screen includes a basic screen alone, changed area decision portion 57 decides on the entire second operation screen as a changed area. Changed area decision portion 57 therefore decides on the entire second operation screen as a changed area when the first operation screen is a composite screen including a sub screen and the second operation screen is a basic screen excluding the sub screen included in the first operation screen. Changed area decision portion 57 outputs the decided changed area to supplemental information transmission portion 61.

In response to input of a changed area from changed area decision portion 57, supplemental information transmission portion 61 generates supplemental information and transmits the supplemental information together with the operation screen to portable information device 200 through communication I/F unit 112. The supplemental information is written, for example, in Java Script (registered trademark) and includes a command to display the changed area in full screen. The supplemental information additionally includes the coordinate indicating the position of the changed area in the operation screen, as a parameter for specifying the changed area. When the changed area is the entire operation screen, supplemental information including a command to display the operation screen in full screen is generated. When the changed area indicates the area of the sub screen in a composite screen, supplemental information including a command to display the sub screen in the operation screen in full screen is generated.

At portable information device 200 receiving the supplemental information together with the operation screen, the command included in the supplemental information is executed, so that the changed area in the operation screen is displayed in full screen. Portable information device 200 thus can display part of or the whole of the operation screen in full screen.

In response to input of a command from instruction receiving portion 51, process execution portion 53 executes a process specified by the command. Examples of the process executed by process execution portion 53 include a scan process of controlling automatic document feeder 120 and document scanning unit 130 to scan a document image, an image forming process of controlling image forming unit 140, paper feed unit 150, and post-processing unit 155 to form an image on paper, a data management process of reading data stored in HDD 115 or CD-ROM 118 or writing data, a facsimile process of controlling facsimile unit 116 to transmit/receive facsimile data, and a data transmission/reception process of controlling communication I/F unit 112 to transmit/receive data. The processes executed by remote control unit 63 include a combination of two or more processes described above. Examples include a copy process which is a combination of a scan process and an image forming process, a scan-to-send process which is combination of a scan process and a data transmission process for transmitting image data obtained by scanning a document image, and a scan-to-BOX process which is a combination of a scan process and a data management process for storing image data obtained by scanning a document image into HDD 115.

Figure 12:
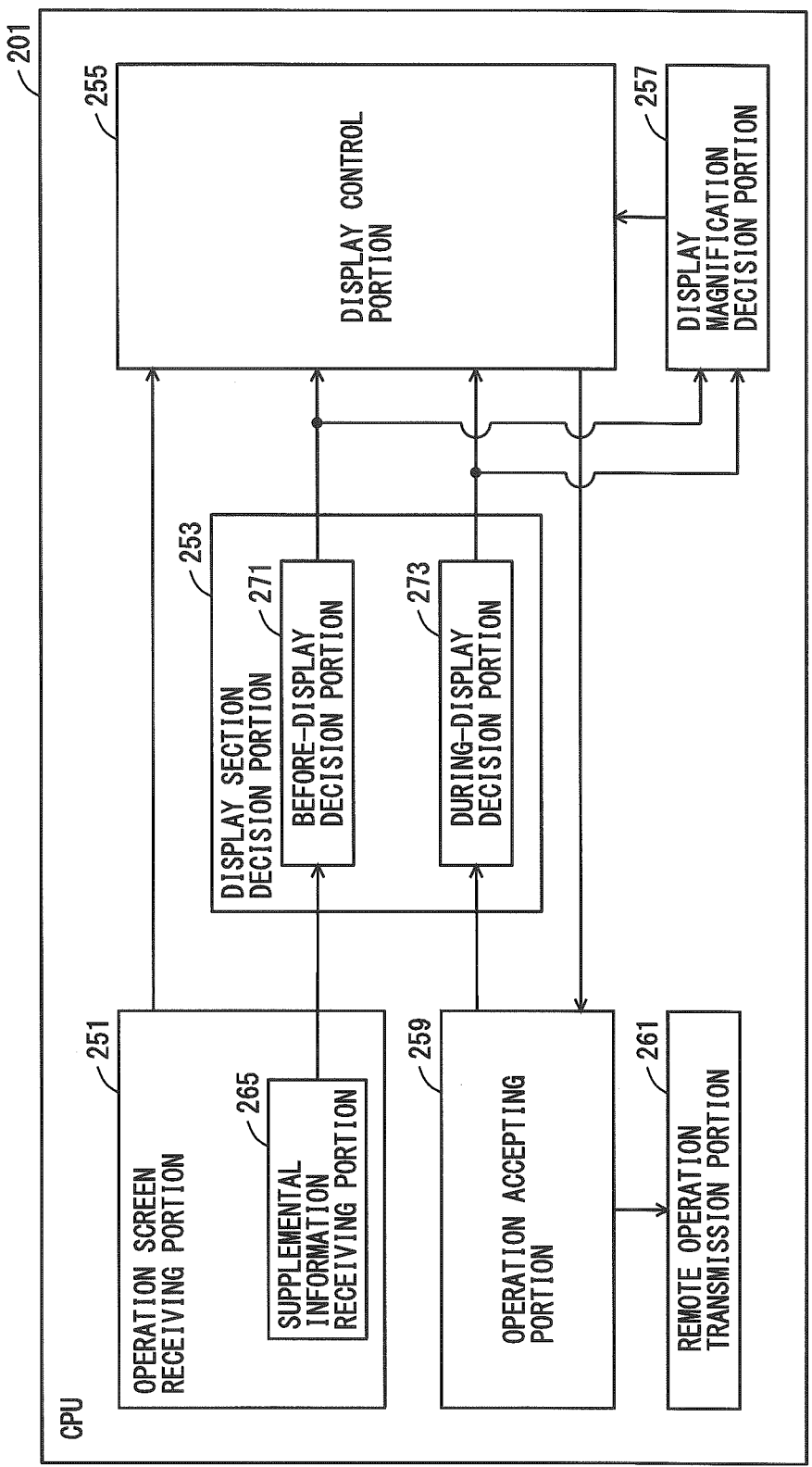
FIG. 12 is a block diagram showing an example of the function overview of the CPU of the portable information device in the first embodiment.

FIG. 12 is a block diagram showing an example of the function overview of the CPU of the portable information device in the first embodiment. The functions shown in FIG. 12 are formed in CPU 201 by CPU 201 of portable information device 200 executing a remote operation program stored in flash memory 203 or CD-ROM 211A.

Referring to FIG. 12, CPU 201 includes an operation screen receiving portion 251, a display section decision portion 253, a display control portion 255, a display magnification decision portion 257, and an operation accepting portion 259 for accepting an operation by a user.

Operation screen receiving portion 251 controls wireless LAN I/F 208 to receive an operation screen from MFP 100. If the user operates operation unit 207 to input an instruction to remotely operate MFP 100, operation screen receiving portion 251 controls wireless LAN I/F 208 to transmit a connection request to MFP 100 in order to establish a communication path with MFP 100. In response to reception of the connection request, CPU 111 of MFP 100 acquires image data indicating an operation screen of operation panel 160 that is stored in HDD 115 of MFP 100, and transmits the acquired image data of the operation screen to portable information device 200. Operation screen receiving portion 251 controls wireless LAN I/F 208 to receive the operation screen through the communication path established with MFP 100. Operation screen receiving portion 251 outputs the operation screen received from MFP 100 to display control portion 255.

Operation screen receiving portion 251 includes a supplemental information receiving portion 265. Supplemental information receiving portion 265 controls wireless LAN I/F 208 to receive supplemental information transmitted together with an operation screen by MFP 100. The supplemental information includes a command to display at least part of the operation screen in full screen. Supplemental information receiving portion 265 outputs the received supplemental information to display section decision portion 253.

Operation accepting portion 259 accepts an operation input to operation unit 207 by the user. Operation accepting portion 259 controls touch panel 207B and, if touch panel 207B detects the position designated by the user, determines the operation by the user, based on the positional information indicating one or more detected positions.

Operation accepting portion 259 receives a display section and positional information indicating the position of the display section in the operation screen from display control portion 255 described later. In response to detection of one position by touch panel 207B, operation accepting portion 259 determines the position in the operation screen corresponding to the detected position, based on the display section and the position of the display section in the operation screen that are input from display control portion 255. Operation accepting portion 259 accepts a remote operation by the user if the determined position in the operation screen is within a transition button, a superimposed button, or a sub screen CLOSE button included in the operation screen. When determining the remote operation, operation accepting portion 259 outputs the positional information indicating the position in the operation screen to remote operation transmission portion 261. In response to input of the positional information from operation accepting portion 259, remote operation transmission portion 261 transmits the positional information to MFP 100 through wireless LAN I/F 208.

If a plurality of positions are detected by touch panel 207B or if one position is detected by touch panel 207B but the detected position is not within a transition button, a superimposed button, or a sub screen CLOSE button included in the operation screen, operation accepting portion 259 accepts an operation by the user to change the display section.

Examples of the operation to change the display section include a flick operation, a swipe operation, a pinch-in operation, a pinch-out operation, and a rotation operation. The flick operation is an operation by the user to move the finger upward, downward, leftward, or rightward faster than a predetermined speed while pointing on touch panel 207B. The swipe operation is an operation by the user to move the finger upward, downward, leftward, or rightward slower than a predetermined speed while pointing on touch panel 207B. The pinch-in operation is an operation by the user to move at least one of two designated positions so as to reduce the distance therebetween while designating the two positions on touch panel 207B. The pinch-out operation is an operation by the user to move at least one of two designated positions so as to increase the distance therebetween while designating the two positions on touch panel 207B. The rotation operation is an operation by the user to move at least one of two designated positions so as to change the orientation of the line between the two positions while designating the two positions on touch panel 207B.

When an operation by the user to change a display section is accepted, operation accepting portion 259 outputs the determined operation together with the parameter corresponding to the operation to display section decision portion 253. The swipe operation and the flick operation include, as a parameter, the direction in which the finger is moved. The pinch-in operation and the pinch-out operation include, as a parameter, a magnification indicating the ratio of change of the distance between the two positions. The rotation operation includes, as a parameter, the clockwise direction or the counterclockwise direction.

Display section decision portion 253 decides on a section of the operation screen that is to be displayed on display unit 161, as a display section. Display section decision portion 253 includes a before-display decision portion 271 and a during-display decision portion 273. Before-display decision portion 271 decides a display section after the operation screen is received and before the operation screen is displayed on display unit 161 by display control portion 255 described later.

Before-display decision portion 271 receives supplemental information from supplemental information receiving portion 265 of operation screen receiving portion 251 and decides a display section based on the supplemental information. Specifically, the command included in the supplemental information is executed, and a display section that is at least part of the operation screen is decided. If the operation screen received by operation screen receiving portion 251 includes a basic screen alone, the entire operation screen is decided as a display section. If the operation screen received by operation screen receiving portion 251 is a composite screen, the section of the sub screen is decided as a display section. Before-display decision portion 271 outputs the positional information indicating the position of the decided display section in the operation screen to display control portion 255 and display magnification decision portion 257. The positional information indicating the position of the display section in the operation screen is indicated by the coordinates of diagonal points of the display section in the operation screen.

During-display decision portion 273 decides a display section while operation screen is being displayed on display unit 161 by display control portion 255 described later. In a stage before during-display decision portion 273 decides a display section, a display section of the operation screen is displayed on display unit 161. During-display decision portion 273 then changes the display section of the operation screen displayed on display unit 161 by display control portion 255. During-display decision portion 273 outputs the positional information indicating the position of the decided display section in the operation screen to display control portion 255 and display magnification decision portion 257. The positional information indicating the position of the display section in the operation screen is indicated by the coordinates of diagonal points of the display section in the operation screen.

During-display decision portion 273 receives the operation by the user to change the display section as accepted by operation accepting portion 259, and the parameter. During-display decision portion 273 changes the display section decided at a point of time when the operation to change the display section is input from operation accepting portion 259, based on the operation to change the display section and the parameter that are input from operation accepting portion 259.

Specifically, when a flick operation is input from operation accepting portion 259, during-display decision portion 273 moves the position of the display section in the operation screen in the direction specified by the parameter input with the flick operation by a predetermined distance T1. When a swipe operation is input from operation accepting portion 259, during-display decision portion 273 moves the position of the display section in the operation screen in the direction specified by the parameter input with the swipe operation by a predetermined distance T2. The distance T2 is smaller than the distance T1.

When a pinch-in operation is input from operation accepting portion 259, during-display decision portion 273 enlarges the size of the display section in the operation screen, based on the magnification specified by the parameter input with the pinch-in operation. When a pinch-out operation is input from operation accepting portion 259, during-display decision portion 273 reduces the size of the display section in the operation screen, based on the magnification specified by the parameter input with the pinch-out operation.

When a rotation operation is input from operation accepting portion 259, during-display decision portion 273 rotates the display section in the operation screen in the direction specified by the parameter input with the rotation operation.

Display magnification decision portion 257 receives the positional information of the display section in the operation screen from before-display decision portion 271 or during-display decision portion 273. Display magnification decision portion 257 decides a display magnification based on the size of the display surface of display unit 206 and the size of the display section and outputs the decided display magnification to display control portion 255. Display magnification decision portion 257 decides on a value obtained by dividing the size of the display section by the size of the display surface of display unit 206, as a display magnification. More preferably, the display magnification is decided for each of the longitudinal direction and the lateral direction, and the smaller one of the display magnification in the longitudinal direction and the display magnification in the lateral direction is employed. Accordingly, the entire display section can be displayed on display unit 206.

Display control portion 255 controls display unit 206 to allow display unit 206 to display an image. Specifically, in response to input of an operation screen from operation screen receiving portion 251, display control portion 255 stores the operation screen into the VRAM (Video Random Access Memory) of display unit 206. Display control portion 255 receives the positional information of the display section from display section decision portion 253 and receives the display magnification from display magnification decision portion 257. Display control portion 255 allows display unit 206 to display the display section specified by the positional information of the display section that is input from display section decision portion 253, in the operation screen stored in the VRAM of display unit 206, at the display magnification input from display magnification decision portion 257. In response to the display section of the operation screen being displayed on display unit 206, display control portion 255 outputs the display section and the positional information indicating the position of the display section in the operation screen to operation accepting portion 259.

In the stage when an operation screen is input from operation screen receiving portion 251, display control portion 255 receives the positional information of the display section from before-display decision portion 271. In the stage after an operation screen is input from operation screen receiving portion 251, display control portion 255 receives the positional information of the display section from during-display decision portion 273. In the stage when an operation screen has been received from MFP 100, therefore, the display section defined by the supplemental information received together with the operation screen appears on display unit 206. In other words, display control portion 255 displays the entire operation screen on display unit 206 if the operation screen is not a composite screen but includes a basic screen alone, whereas display control portion 255 displays the entire sub screen in the composite screen on display unit 206 if the operation screen is a composite screen.

In the stage after an operation screen has been received from MFP 100 and the entire operation screen or the entire sub screen has appeared on display unit 206, display control portion 255 displays, on display unit 206, the display section of the operation screen that has been changed in accordance with an operation to change a display section that is input to operation unit 207 by the user. When a swipe operation or a flick operation is input, the section of the operation screen that is to be displayed on display unit 206 is changed. When a pinch-in operation is input, the section of the operation screen that is being displayed is reduced in size. When a pinch-out operation is input, the section of the operation screen that is being displayed is enlarged in size.

For example, a description will be given with a case where the user inputs a pinch-out operation in a state in which basic screen 300 shown in FIG. 5 appears on display unit 206 as an operation screen (the first operation screen) and the display section including superimposed button 302 that is part of basic screen 300 appears on display unit 206. In this case, if the user designates superimposed button 302, MFP 100 returns an operation screen (the second operation screen) that is composite screen 300A shown in FIG. 7 and supplemental information including a command to display the section of sub screen 320. Composite screen 300A is a screen in which a sub screen associated with superimposed button 302 included in basic screen 300, here, sub screen 320 shown in FIG. 6, is combined.

At portable information device 200, the entire sub screen 320 included in the operation screen (the second operation screen) that is composite screen 300A appears in full screen on display unit 206. Accordingly, the operation screen that is composite screen 300A is not entirely displayed but the entire sub screen 320 is displayed, so that the content of sub screen 320 can be easily viewed. This is because in a case where the entire sub screen 320 is displayed in full screen, sub screen 320 is displayed in an enlarged size when compared with a case where the entire composite screen 300A is displayed in full screen.

In some cases, there is no need for inputting an operation to change the display section in order to input the next operation. For example, in a case where the entire operation screen that is composite screen 300A is displayed, input of a pinch-out operation may be required to view the content of sub screen 320. However, the entire sub screen 320 is displayed, thereby eliminating the need for inputting a pinch-out operation.

In a case where the operation screen that is composite screen 300A is not entirely displayed but composite screen 300A is partially displayed at a display magnification set before superimposed button 302 is designated, only part of sub screen 320 may appear on display unit 206 depending on the display magnification. In this case, a swipe operation, a flick operation, or a pinch-in operation has to be input in order to display the section not displayed in sub screen 320. However, the entire sub screen 320 is displayed, thereby eliminating the need for inputting such an operation to change a display section.

If CLOSE button 321 included in sub screen 320 is designated in a state in which the entire sub screen 320 included in the operation screen (the first operation screen) that is composite screen 300A is displayed, MFP 100 returns the operation screen (the second operation screen) that is basic screen 300 and supplemental information including a command to display the entire operation screen. At portable information device 200, the entire operation screen (the second operation screen) that is basic screen 300 appears on display unit 206.

In a case where CLOSE button 321 included in sub screen 320 is designated in a state in which the operation screen (the first operation screen) that is composite screen 300A is not entirely displayed but the entire sub screen 320 is displayed, if the operation screen (the second operation screen) that is basic screen 300 appears not entirely but at the display magnification set before CLOSE button 321 is designated, only part of the operation screen is displayed on display unit 206. In this case, a swipe operation, a flick operation, or a pinch-in operation has to be input in order to display the section not displayed in the operation screen. However, the entire operation screen (the second operation screen) that is basic screen 300 is displayed, thereby eliminating the need for changing the display section and the need for inputting a swipe operation, a flick operation, or a pinch-in operation.

If the user designates transition button 312 in a state in which basic screen 300 shown in FIG. 5 is displayed as an operation screen (the first operation screen) on display unit 206, MFP 100 returns an operation screen (the second operation screen) that is composite screen 330A shown in FIG. 9 and supplemental information including a command to display the operation screen that is composite screen 330A in full screen. This is because basic screen 300 of the first operation screen differs from specific basic screen 330 of composite screen 330A that is the second operation screen.

If the user designates superimposed button 333 that is part of composite screen 330A in a state in which the operation screen (the first operation screen) that is composite screen 330A shown in FIG. 9 is displayed on display unit 206, MFP 100 returns an operation screen (the second operation screen) that is composite screen 340 shown in FIG. 10 and supplemental information including a command to display the section of sub screen 343. Composite screen 340 is a screen in which sub screen 343 associated with superimposed button 333 included in specific basic screen 330 is combined.

At portable information device 200, the entire sub screen 343 included in the operation screen (the second operation screen) that is composite screen 340 appears in full screen on display unit 206. Accordingly, the operation screen that is composite screen 340 is not entirely displayed but the entire sub screen 343 is displayed, so that the content of sub screen 343 can be easily viewed. This is because in a case where the entire sub screen 343 is displayed in full screen, sub screen 343 is displayed in an enlarged size when compared with a case where the entire composite screen 340 is displayed in full screen.

Figure 13:
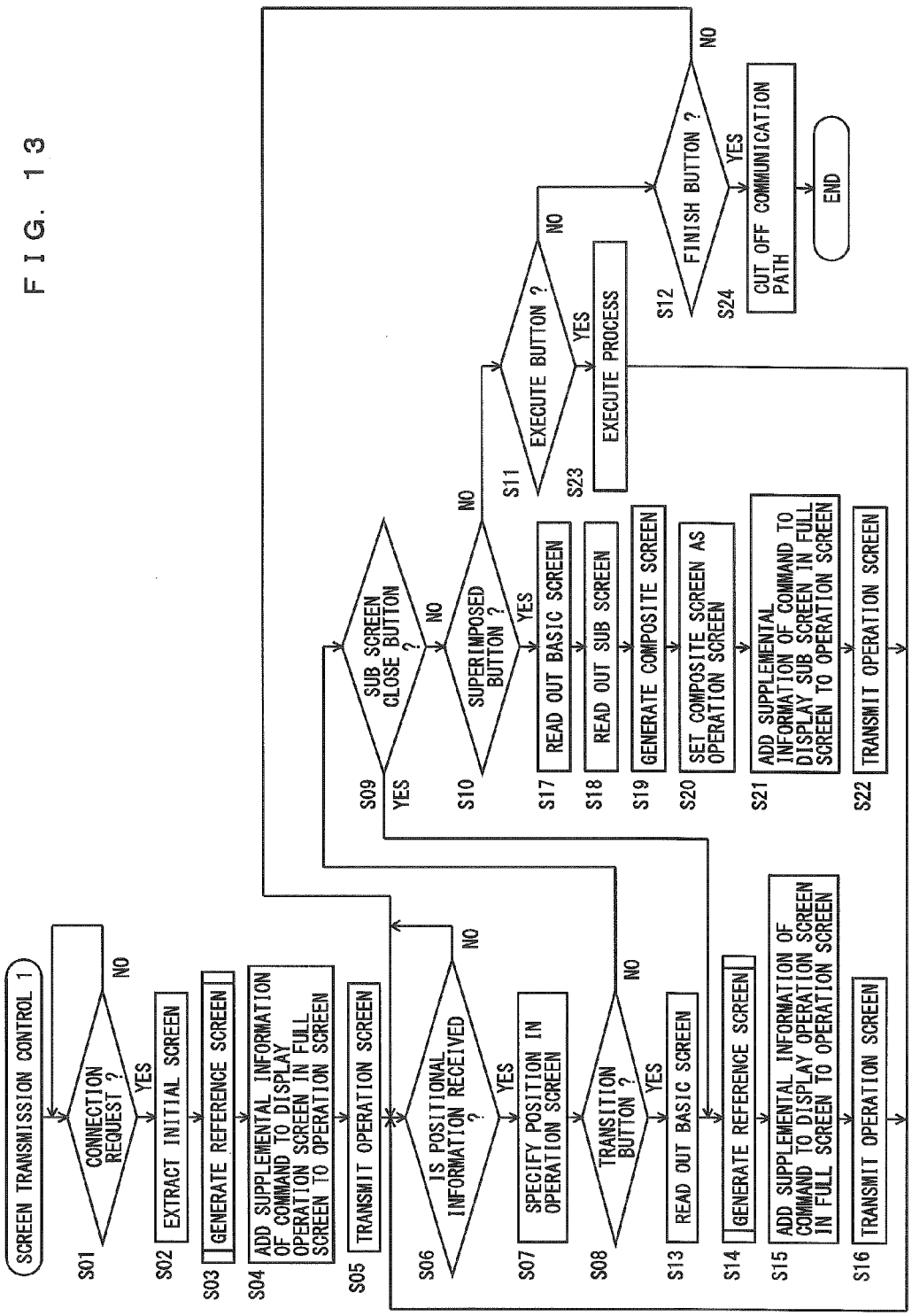
FIG. 13 is a flowchart showing an example of the procedure of a screen transmission control process in the first embodiment.

FIG. 13 is a flowchart showing an example of the procedure of a screen transmission control process in the first embodiment. The screen transmission control process is a process executed by CPU 111 by CPU 111 of MFP 100 executing the screen transmission control program stored in ROM 113, HDD 115, or CD-ROM 118. Referring to FIG. 13, CPU 111 determines whether a connection request has been received (step S01). It is determined whether communication I/F unit 112 has received a connection request from the outside. Here, a case where a connection request is received from portable information device 200 will be described by way of example. The process waits until a connection request is received from portable information device 200 (NO in step S01). If a connection request has been received from portable information device 200 (YES in step S01), the process proceeds to step S02. If a connection request has been received, a communication path is established by negotiating with portable information device 200.

In step S02, an initial screen is read out from HDD 115, and the process proceeds to step S03. A basic screen preset as an initial screen is read out from among a plurality of operation screens stored in HDD 115. In step S03, a reference screen generation process is performed. The reference screen generation process is a process of generating an operation screen serving as a reference based on the basic screen. The operation screen serving as a reference is referred to as a reference screen.

Figure 14:
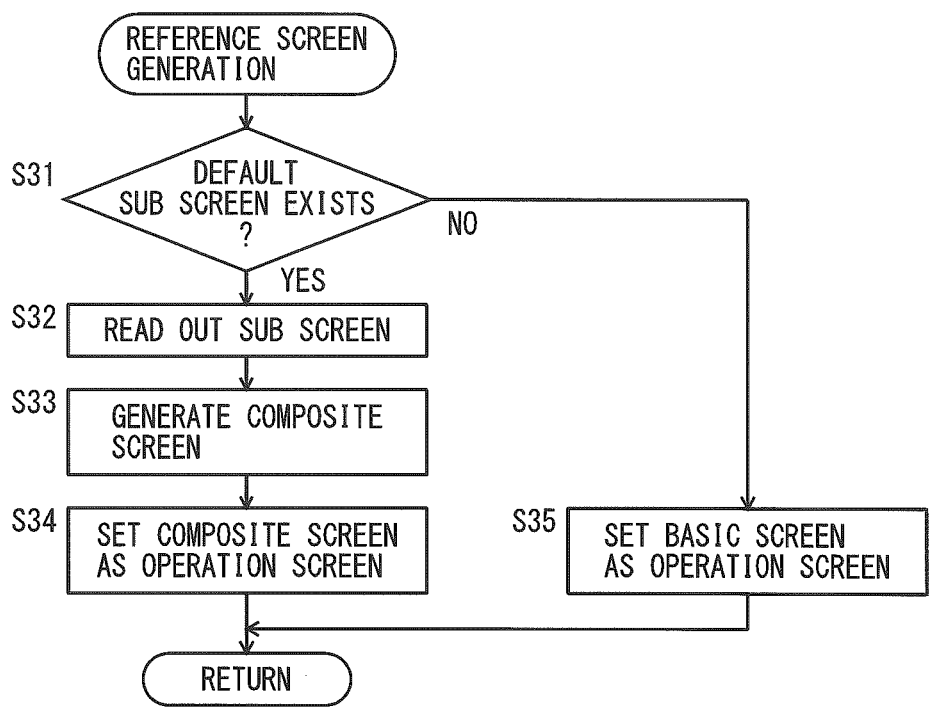
FIG. 14 is a flowchart showing an example of the procedure of a reference screen generation process.

FIG. 14 is a flowchart showing an example of the procedure of the reference screen generation process. A basic screen to be processed is set in a stage before the reference screen generation process is performed. Referring to FIG. 14, it is determined whether a default sub screen is related to the basic screen to be processed (step S31). If a default sub screen is related to the basic screen, the process proceeds to step S32. If not, the process proceeds to step S35. In step S35, the basic screen is set as an operation screen, and the process returns to the screen transmission control process.

In step S32, the default sub screen related to the basic screen is read out from HDD 115, and the process proceeds to step S33. The default sub screen related to the basic screen is read out from among a plurality of sub screens stored in HDD 115. In step S33, a composite image is generated in which the basic screen and the sub screen read out in step S32 are combined, and the process proceeds to step S34. In step S34, the composite image is set as an operation screen, and the process returns to the screen transmission control process.

Returning to FIG. 13, in step S04, supplemental information including a command to display the operation screen in full screen is added to the operation screen. The supplemental information is written in, for example, Java Script (registered trademark).

In the next step S05, the operation screen is transmitted through communication I/F unit 112 via the communication path established in step S01. At portable information device 200, the operation screen including the basic screen as an initial screen then appears on display unit 206 of portable information device 200. If the user of portable information device 200 designates a given position in the operation screen appearing on display unit 206, for example, with a finger, portable information device 200 transmits the positional information indicating the position designated by the user in the operation screen to MFP 100.

In step S06, it is determined whether the positional information has been received from portable information device 200. The process waits until the positional information is received (NO in step S06). If the positional information has been received (YES in step S06), the process proceeds to step S07. In step S07, the position in the operation screen is specified based on the received positional information. The operation screen is the operation screen transmitted to portable information device 200 in step S05 or step S16 or step S22 described later.

In steps S08 to S12, the process branches depending on the position specified in the operation screen. If the position designated in the operation screen is within a transition button (YES in step S08), the process proceeds to step S13. If the position specified in the operation screen is within a sub screen CLOSE button (YES in step S09), the process proceeds to step S14. If within a superimposed button (YES in step S10), the process proceeds to step S17. If within an EXECUTE button (YES in step S11), the process proceeds to step S23. If within a FINISH button (YES in step S12), the process proceeds to step S24. If none of them applies, the process returns to step S06.

In step S13, the basic screen associated with the transition button is read out from HDD 115, and the process proceeds to step S14. The basic screen associated with the transition button is read out from among a plurality of basic screens stored in HDD 115. With the read basic screen to be processed, the reference screen generation process shown in FIG. 12 is performed (step S14), and the process proceeds to step S15. In step S15, supplemental information including a command to display the operation screen in full screen is added to the operation screen.

In the next step S16, the operation screen is transmitted through communication I/F unit 112 via the communication path established in step S01, and the process returns to step S06. At portable information device 200, the entire operation screen including the basic screen associated with the transition button then appears on display unit 206 of portable information device 200.

In step S09, if it is determined that the sub screen CLOSE button is designated, the process proceeds to step S14. In this case, the operation screen including the sub screen has been transmitted to portable information device 200 in a stage before step S09 is performed. When the process proceeds from step S09 to step S14, a reference screen is generated based on the basic screen included in the operation screen including the sub screen that has been transmitted to portable information device 200 in a stage before step S09 is performed.

The process proceeds to step S17 when the user of portable information device 200 designates a superimposed button in the operation screen. In step S17, the basic screen including the superimposed button is read out from HDD 115, and the process proceeds to step S18. In step S18, the sub screen related to the superimposed button is read out from among a plurality of sub screens stored in HDD 115.

A composite image is then generated in which the basic screen read out step S17 and the sub screen read out in step S18 are combined (step S19), and the process proceeds to step S20. In step S20, the composite image is set as an operation screen, and the process proceeds to step S21. In step S21, supplemental information including a command to display the sub screen in the operation screen in full screen is added to the operation screen. In the next step S22, the operation screen is transmitted through communication I/F unit 112 via the communication path established in step S01. The process then returns to step S06. At portable information device 200, the entire sub screen associated with the transition button then appears in full screen on display unit 206.

The process proceeds to step S23 when the user of portable information device 200 designates the EXECUTE button in the operation screen. In step S23, the process associated with the EXECUTE button is performed, and the process returns to step S06.

The process proceeds to step S24 when the user of portable information device 200 designates the FINISH button in the operation screen. In step S24, the communication path established in step S01 is cut off, and the process ends.

Figure 15:
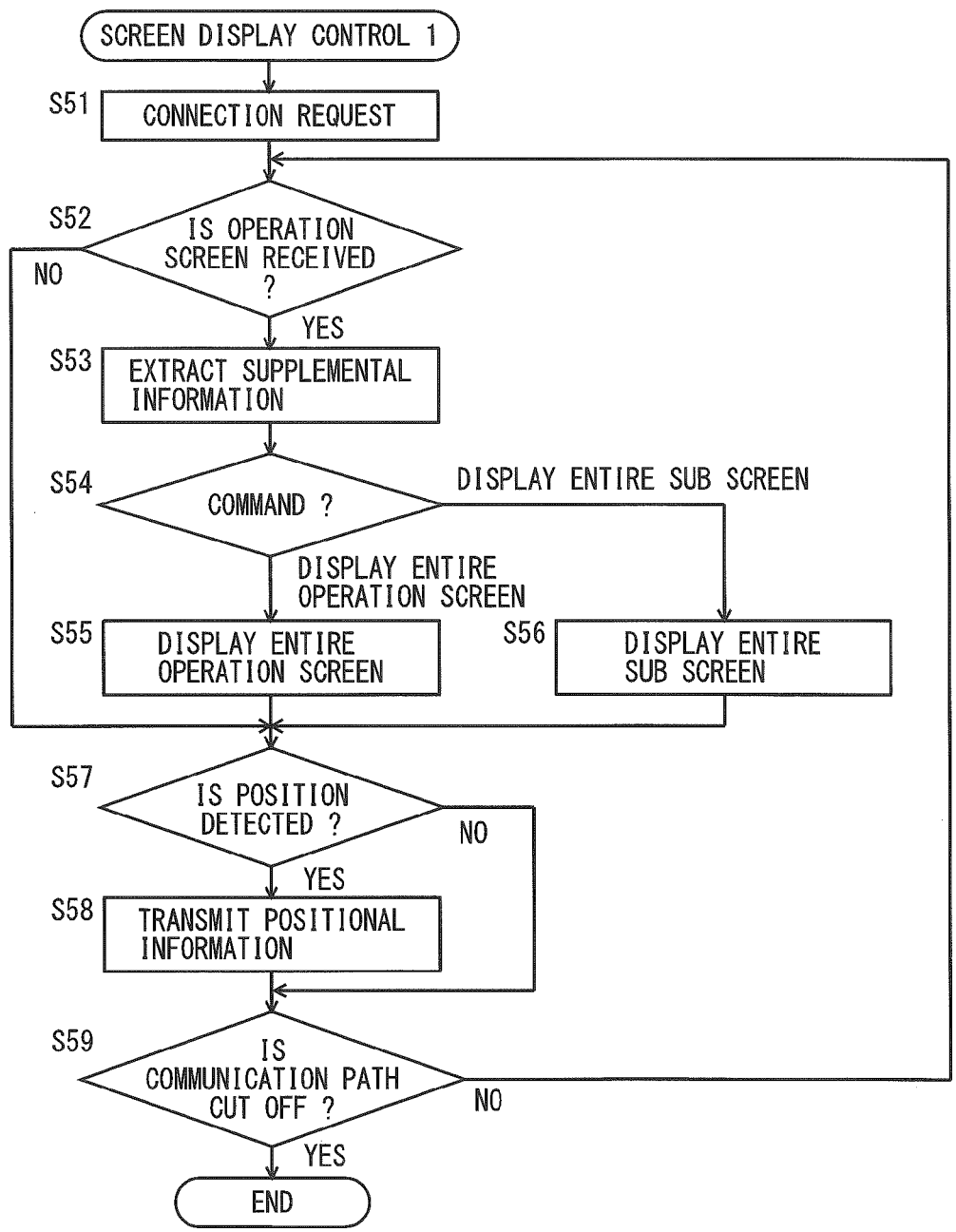
FIG. 15 is a flowchart showing an example of the procedure of a screen display control process in the first embodiment.

FIG. 15 is a flowchart showing an example of the procedure of a screen display control process in the first embodiment. The screen display control process is a function formed in CPU 201 by CPU 201 of portable information device 200 executing the screen display control program stored in flash memory 203 or CD-ROM 211A. Referring to FIG. 15, CPU 201 transmits a connection request to MFP 100 (step S51). If the user inputs an instruction for remotely controlling MFP 100 to portable information device 200, CPU 201 transmits a connection request to MFP 100 through wireless LAN I/F 208. A communication path is subsequently established by negotiating with MFP 100.

In the next step S52, if an operation screen has been received, the process proceeds to step S53. If not, the process proceeds to step S57. If an operation screen has not been received from MFP 100, the process waits until an operation screen is received.

In step S53, supplemental information is extracted from the received operation screen. The process branches depending on the command included in the extracted supplemental information. If the command indicates to display the entire operation screen, the process proceeds to step S55. If the command indicates to display the entire sub screen, the process proceeds to step S56. In step S55, the entire operation screen received in step S52 appears in full screen on display unit 206, and the process proceeds to step S57. In step S56, the entire sub screen in the operation screen received in step S52 appears in full screen on display unit 206, and the process proceeds to step S57. The position of the sub screen in the operation screen is specified by the parameter included in the supplemental information.

In step S57, it is determined whether touch panel 207B detects the position designated by the user. If the position designated by the user is detected, the process proceeds to step S58. If not, the process proceeds to step S59. In step S58, the positional information indicating the position detected in step S57 is transmitted to MFP 100 through wireless LAN I/F 208 via the communication path established instep S51, and the process proceeds to step S59.

In step S59, it is determined whether the communication path established in step S51 has been cut off. If the communication path has been cut off, the process ends. If not, the process returns to step S52.

As described above, MFP 100 in the first embodiment functions as a remote control device remotely controlled by portable information device 200. MFP 100 decides on an area in the second operation screen that is different from the first operation screen, as a changed area, in a stage before the second operation screen is transmitted to portable information device 200 subsequently to the first operation screen. MFP 100 then transmits supplemental information including a command to display the changed area in full screen together with the second operation screen to portable information device 200. At portable information device 200 receiving the second operation screen, the section of the second operation screen that is different from the first operation screen appears in full screen. The user of portable information device 200 therefore does not have to input a scroll operation or a pinch-in operation for displaying the changed area in an enlarged size, when compared with a case where the entire second operation screen is displayed.

If the operation screen is a web page written in a markup language such as HTML (Hyper Text Markup Language), it is only necessary to install a general browsing program commercially available for viewing a web page, in portable information device 200.

If the second operation screen is a composite screen, MFP 100 decides on the area of the sub screen in the second operation screen as a changed area. The changed area thus can be decided easily.

Even when the second operation screen is a composite screen, if the basic screen of the first operation screen is different from the basic screen of the second operation screen, MFP 100 does not decide on the area of the sub screen as a changed area. Therefore, when the basic screen is changed, portable information device 200 can display the entire operation screen.

When the area of the sub screen is not decided as a changed area, MFP 100 decides on the entire second operation screen as a changed area. Therefore, portable information device 200 can display the entire second operation screen.

If the second operation screen includes a basic screen alone in a stage before the second operation screen is transmitted subsequently to the first operation screen, the entire second operation screen is decided as a changed area. Therefore, portable information device 200 can display the entire second operation screen.

Second Embodiment

The overview of the remote control system 1 in a second embodiment is the same as the overview shown in FIG. 1. The overview of MFP 100 in the second embodiment and the hardware configuration of MFP 100 are the same as the overview shown in FIG. 2 and the hardware configuration shown in FIG. 3. The hardware configuration of portable information device 200 in the second embodiment is the same as the hardware configuration shown in FIG. 4. A description thereof is not repeated here.

Figure 16:
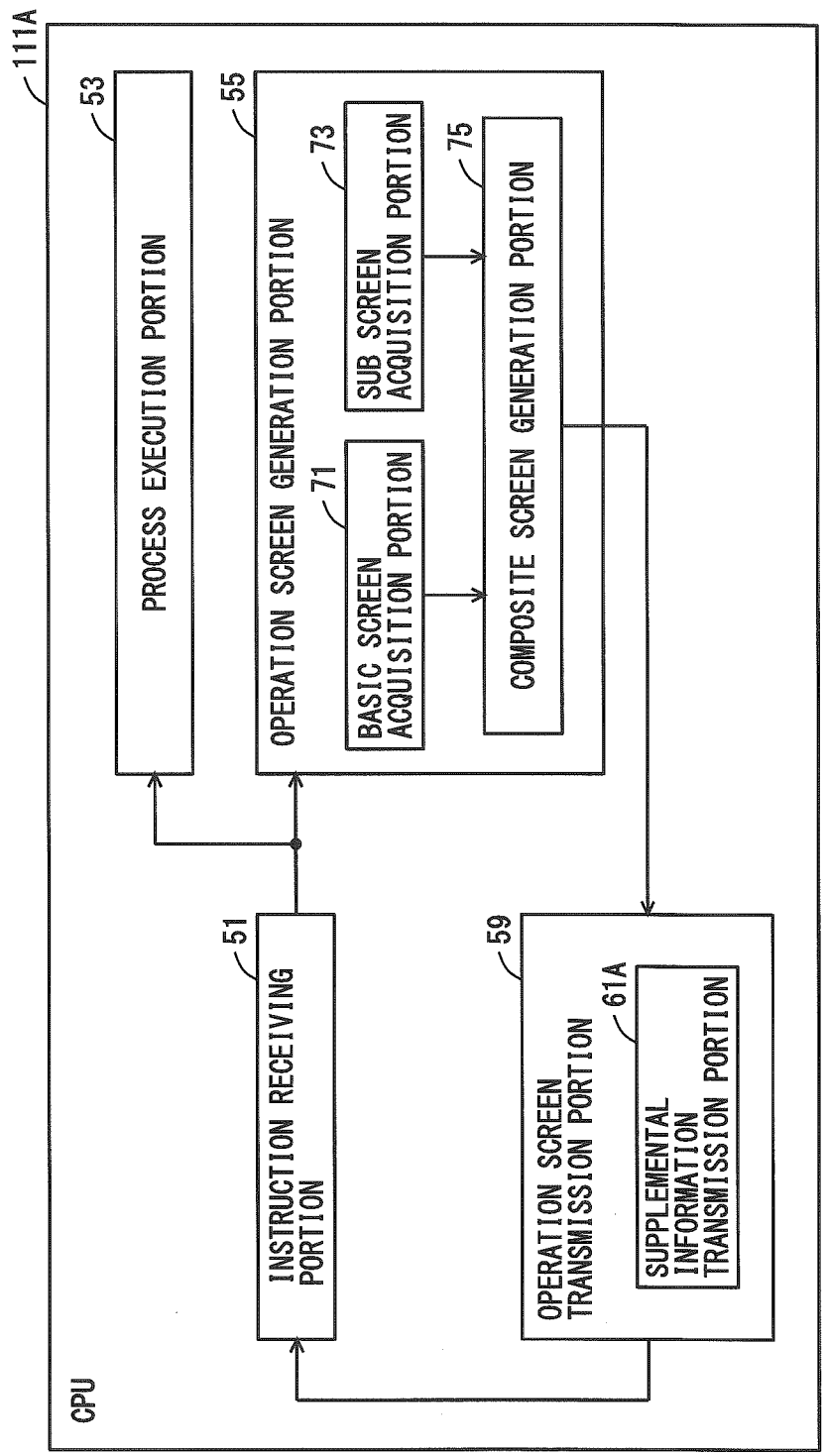
FIG. 16 is a block diagram showing an example of the functions of the CPU of the MFP in a second embodiment.

FIG. 16 is a block diagram showing an example of the functions of the CPU of the MFP in the second embodiment. The functions of CPU 111A of MFP 100 shown in FIG. 16 differ from the functions shown in FIG. 11 in that changed area decision portion 57 is deleted and that supplemental information transmission portion 61 is changed to a supplemental information transmission portion 61A. The other functions are the same as the functions shown in FIG. 11, and a description thereof is not repeated here.

Supplemental information transmission portion 61A determines whether the operation screen input from composite screen generation portion 75 is a composite screen. If the operation screen is not a composite screen, supplemental information transmission portion 61A transmits supplemental information indicating that the operation screen is a reference screen, together with the operation screen, to portable information device 200 through communication I/F unit 112. If the operation screen is a composite screen, supplemental information transmission portion 61A determines whether the composite screen is a composite screen in which a basic screen is combined with a sub screen set by default. If the operation screen is a composite screen in which a basic screen is combined with a sub screen set by default, supplemental information transmission portion 61A transmits supplemental information indicating that the operation screen is a reference screen, together with the operation screen, to portable information device 200 through communication I/F unit 112. If the operation screen is a composite screen in which a basic screen is combined with a sub screen different from the sub screen set by default, supplemental information transmission portion 61A transmits supplemental information indicating that the operation screen is not a reference screen, together with the operation screen, to portable information device 200 through communication I/F unit 112.

Figure 17:
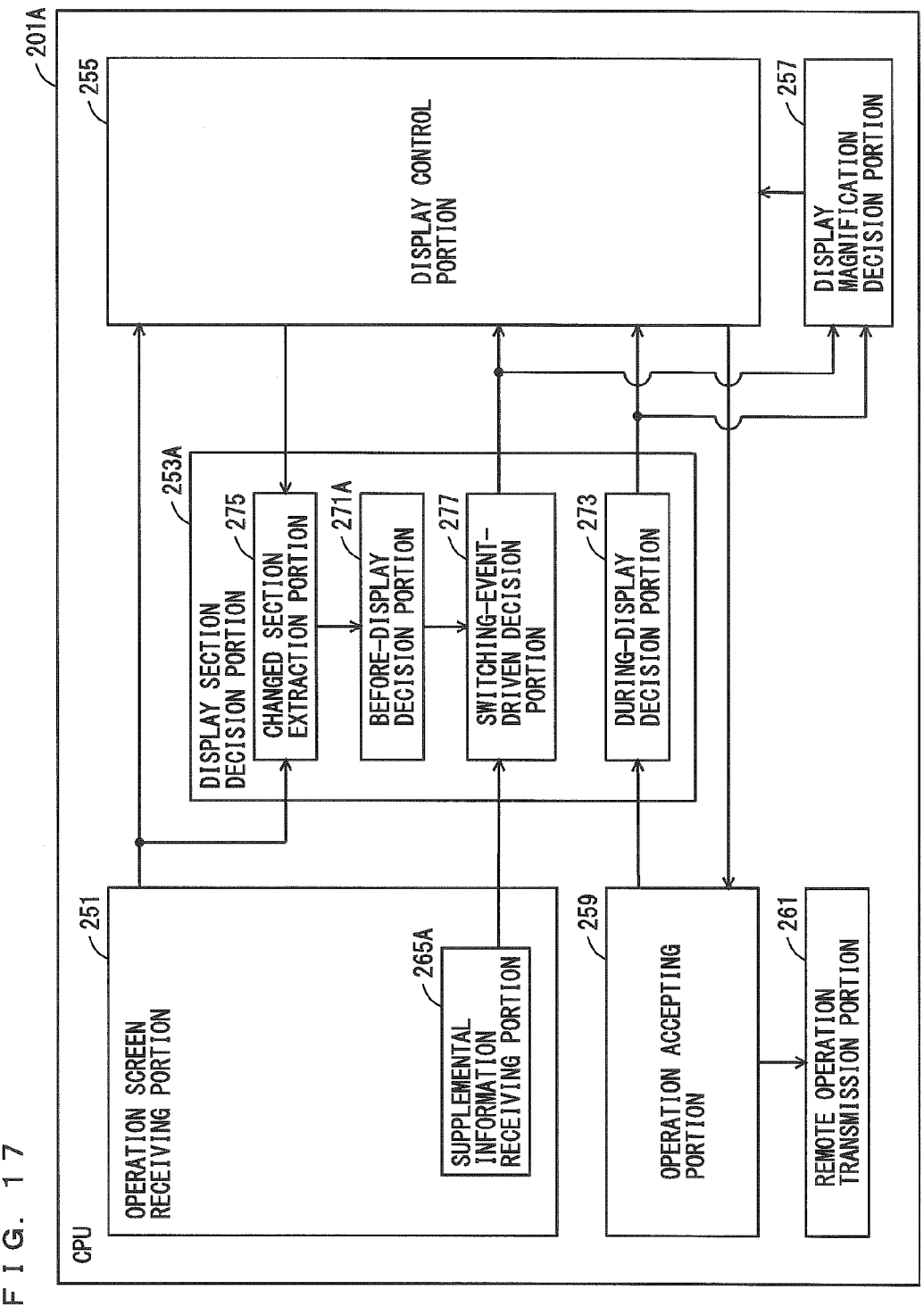
FIG. 17 is a block diagram showing an example of the function overview of the CPU of the portable information device in the second embodiment.

FIG. 17 is a block diagram showing an example of the function overview of the CPU of the portable information device in the second embodiment. The functions shown in FIG. 17 are formed in CPU 201A by CPU 201A of the portable information device 200 in the second embodiment executing the remote operation program stored in flash memory 203 or CD-ROM 211A. Referring to FIG. 17, the functions differ from those in FIG. 12 in that display section decision portion 253 and supplemental information receiving portion 265 are changed to display section decision portion 253A and supplemental information receiving portion 265A, respectively. The same functions as those shown in FIG. 12 are denoted with the same reference signs and a description thereof is not repeated here.

Supplemental information receiving portion 265A controls wireless LAN I/F 208 to receive supplemental information transmitted together with the operation screen by MFP 100. The supplemental information indicates whether the operation screen is a reference screen. Supplemental information receiving portion 265A outputs the received supplemental information to display section decision portion 253A.

Display section decision portion 253A receives an operation screen from operation screen receiving portion 251 and decides on a section to be displayed on display unit 161 in the received operation screen, as a display section. Display section decision portion 253A includes a changed section extraction portion 275, a before-display decision portion 271A, a switching-event-driven decision portion 277, and a during-display decision portion 273.

Changed section extraction portion 275 receives the operation screen (the first operation screen) set as a display target from display control portion 255 and receives the operation screen (the second operation screen) received from MFP 100 from operation screen receiving portion 251. The operation screen input from display control portion 255 is the operation screen to be displayed on display unit 206 by display control portion 255. The operation screen input from operation screen receiving portion 251 is the operation screen received from MFP 100. Since display control portion 255 displays the operation screen received by operation screen receiving portion 251 on display unit 206, the operation screen (the first operation screen) input from display control portion 255 is the operation screen received by operation screen receiving portion 251 before the operation screen (the second operation screen) input from operation screen receiving portion 251.

If the operation screen (the second operation screen) is input from operation screen receiving portion 251 after the operation screen (the first operation screen) set as a display target is input from display control portion 255, changed section extraction portion 275 extracts, as a changed section, a section different from the operation screen (the first operation screen) input from display control portion 255, in the operation screen (the second operation screen) input from operation screen receiving portion 251. The changed section preferably has a predetermined size or larger. If there a plurality of sections different from the operation screen (the first operation screen) input from display control portion 255, in the operation screen (the second operation screen) input from operation screen receiving portion 251, the section having the largest size is decided as a changed section. When the changed section is extracted, changed section extraction portion 275 outputs the extracted changed section to before-display decision portion 271A. If the operation screen (the second operation screen) received by operation screen receiving portion 251 is a composite screen, the changed section extracted by changed section extraction portion 275 is the section of the sub screen.

When a changed section is input from changed section extraction portion 275, before-display decision portion 271A decides on the changed section as a display section and outputs the decided display section to switching-event-driven decision portion 277.

Switching-event-driven decision portion 277 receives a changed section from before-display decision portion 271A and receives supplemental information from supplemental information receiving portion 265A. If the supplemental information indicates that the operation screen is not a reference screen, switching-event-driven decision portion 277 outputs the display section input from before-display decision portion 271A to display control portion 255 and display magnification decision portion 257. If the supplemental information indicates that the operation screen is a reference screen, switching-event-driven decision portion 277 changes the display section to the entire operation screen and outputs the positional information indicating the position of the changed display section in the operation screen to display control portion 255 and display magnification decision portion 257. The positional information indicating the position of the display section in the operation screen is indicated by the coordinates of diagonal points of the display section in the operation screen.

Switching-event-driven decision portion 277 decides on the entire operation screen as a display section if the operation screen received by operation screen receiving portion 251 is a reference screen, whereas switching-event-driven decision portion 277 decides on the section of the sub screen as a display section if the operation screen received by operation screen receiving portion 251 is not a reference screen.

In the stage after an operation screen has been received from MFP 100 and the entire operation screen or the entire sub screen has appeared on display unit 206, display control portion 255 displays, on display unit 206, the display section of the operation screen that has been changed in accordance with an operation to change a display section that is input to operation unit 207 by the user. When a swipe operation or a flick operation is input, the section of the operation screen that is to be displayed on display unit 206 is changed. When a pinch-in operation is input, the section of the operation screen that is being displayed is reduced in size. When a pinch-out operation is input, the section of the operation screen that is being displayed is enlarged in size.

For example, a description will be given with a case where the user inputs a pinch-in operation in a state in which basic screen 300 shown in FIG. 5 appears on display unit 206 as an operation screen (the first operation screen), so that a display section including superimposed button 302 that is part of basic screen 300 appears on display unit 206. In this case, if the user designates superimposed button 302, MFP 100 returns the operation screen (the second operation screen) that is composite screen 300A shown in FIG. 7 and supplemental information indicating that the operation screen is not a reference screen. Composite screen 300A is a screen in which a sub screen associated with superimposed button 302 included in basic screen 300, here, sub screen 320 shown in FIG. 6, is combined.

At portable information device 200, the entire sub screen 320 appears in full screen on display unit 206, because sub screen 320 included in the operation screen (the second operation screen) that is composite screen 300A is decided as a display section. Accordingly, the operation screen that is composite screen 300A is not entirely displayed but the entire sub screen 320 is displayed, so that the content of sub screen 320 can be easily viewed. This is because in a case where the entire sub screen 320 is displayed in full screen, sub screen 320 is displayed in an enlarged size when compared with a case where the entire composite screen 300A is displayed in full screen.

In some cases, there is no need for inputting an operation to change a display section in order to input the next operation. For example, in a case where the entire operation screen that is composite screen 300A is displayed, input of a pinch-out operation may be required in order to view the content of sub screen 320. However, the entire sub screen 320 is displayed, thereby eliminating the need for inputting a pinch-out operation.

In a case where the operation screen that is composite screen 300A is not entirely displayed but composite screen 300A is partially displayed at a display magnification set before superimposed button 302 is designated, only part of sub screen 320 may appear on display unit 206 depending on the display magnification. In this case, a swipe operation, a flick operation, or a pinch-in operation has to be input in order to display the section not displayed in sub screen 320. However, the entire sub screen 320 is displayed, thereby eliminating the need for inputting such an operation to change a display section.

If CLOSE button 321 included in sub screen 320 is designated in a state in which the entire sub screen 320 included in the operation screen (the first operation screen) that is composite screen 300A is displayed, MFP 100 returns the operation screen (the second operation screen) that is basic screen 300 and supplemental information indicating that the operation screen is a reference screen. At portable information device 200, the entire operation screen (the second operation screen) that is basic screen 300 appears on display unit 206 because the entire operation screen (the second operation screen) that is basic screen 300 is decided as a display section.

In a case where CLOSE button 321 included in sub screen 320 is designated in a state in which the operation screen (the second operation screen) that is basic screen 300 is not entirely displayed but the entire sub screen 320 is displayed, if the operation screen (the second operation screen) that is basic screen 300 is displayed not entirely but at the display magnification set before CLOSE button 321 is designated, only part of the operation screen is displayed on display unit 206. In this case, a swipe operation, a flick operation, or a pinch-in operation has to be input in order to display the section not displayed in the operation screen. However, the entire operation screen (the second operation screen) that is basic screen 300 is displayed, thereby eliminating the need for changing the display section and the need of inputting a swipe operation, a flick operation, or a pinch-in operation.

If the user designates transition button 312 in a state in which basic screen 300 shown in FIG. 5 is displayed as an operation screen (the first operation screen) on display unit 206, MFP 100 returns the operation screen (the second operation screen) that is composite screen 330A shown in FIG. 9 and supplemental information indicating that the operation screen that is composite screen 330A is a reference screen. This is because basic screen 300 of the first operation screen differs from specific basic screen 330 of composite screen 330A that is the second operation screen.

If the user designates superimposed button 333 that is part of composite screen 330A in a state in which the operation screen (the first operation screen) that is composite screen 330A shown in FIG. 9 is displayed on display unit 206, MFP 100 returns the operation screen (the second operation screen) that is composite screen 340 shown in FIG. 10 and supplemental information that the operation screen is not a reference screen. Composite screen 340 is a screen in which sub screen 343 associated with superimposed button 333 included in specific basic screen 330 is combined.

At portable information device 200, the entire sub screen 343 included in the operation screen (the second operation screen) that is composite screen 340 appears in full screen on display unit 206. Accordingly, the operation screen that is composite screen 340 is not entirely displayed but the entire sub screen 343 is displayed, so that the content of sub screen 343 can be easily viewed. This is because in a case where the entire sub screen 343 is displayed in full screen, sub screen 343 is displayed in an enlarged size when compared with a case where the entire composite screen 340 is displayed in full screen.

Figure 18:
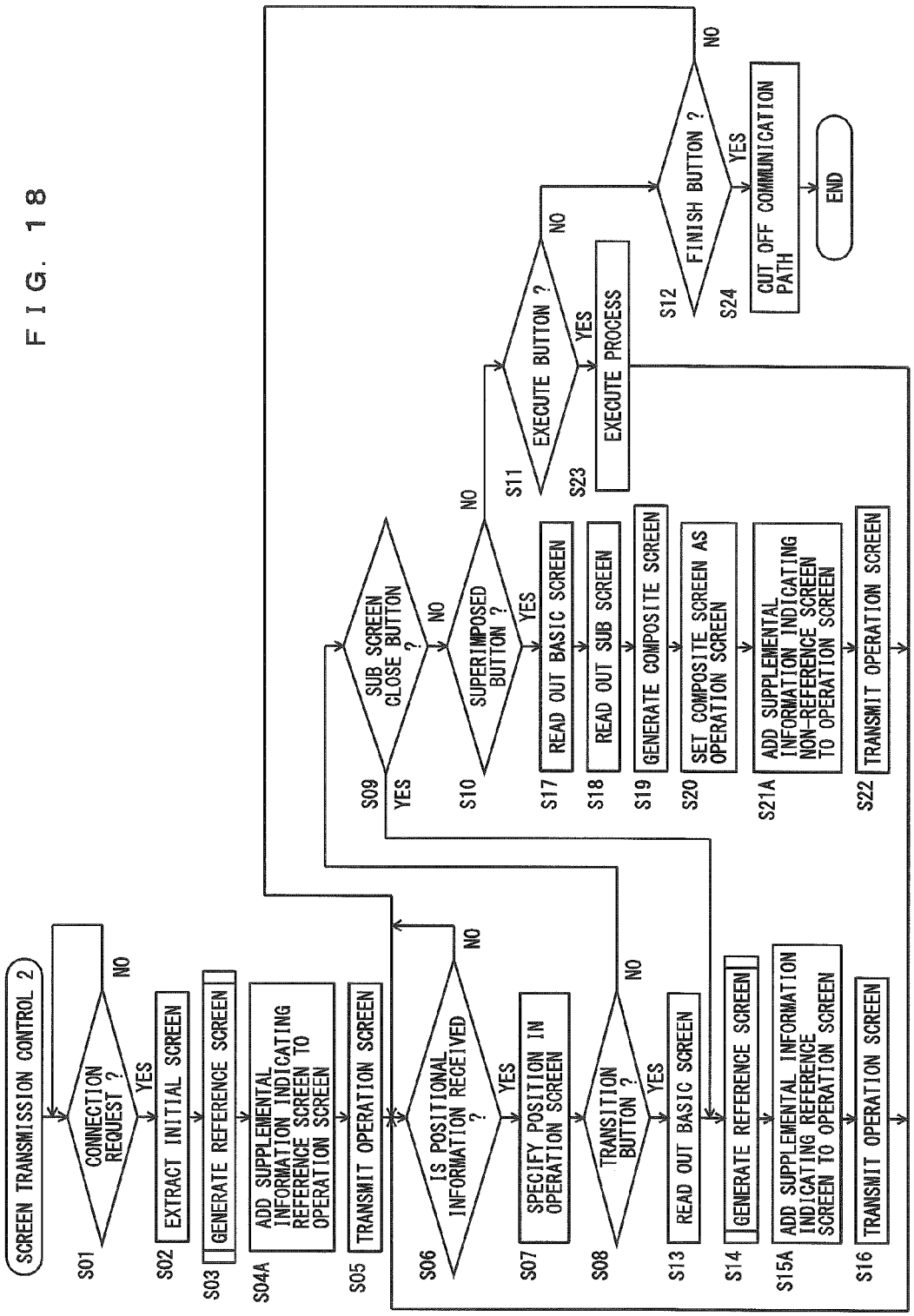
FIG. 18 is a flowchart showing an example of the procedure of a screen transmission control process in the second embodiment.

FIG. 18 is a flowchart showing an example of the procedure of a screen transmission control process in the second embodiment. The screen transmission control process is executed by CPU 111A of MFP 100 in the second embodiment executing the screen transmission control program stored in ROM 113, HDD 115, or CD-ROM 118. Referring to FIG. 18, the flowchart differs from that in FIG. 13 in that step S04, step S15, and step S21 are changed to step S04A, step S15A, and step S21A, respectively. The other processing is the same as the processing shown in FIG. 13 and a description thereof is not repeated here.

In step S04A and step S15A, supplemental information indicating that the operation screen is a reference screen is added to the operation screen. In step S21A, supplemental information indicating that the operation screen is not a reference screen is added to the operation screen.

Figure 19:
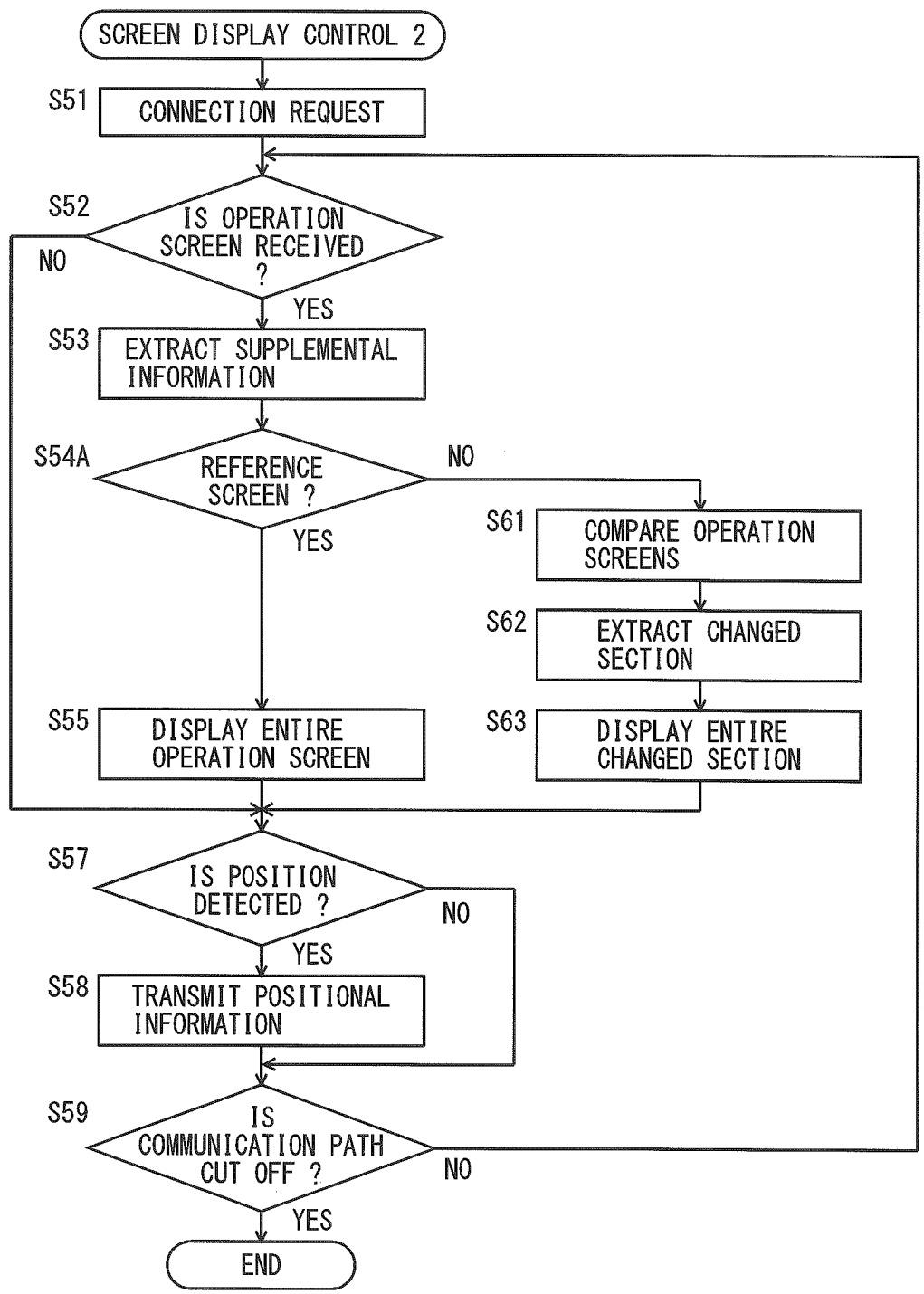
FIG. 19 is a flowchart showing an example of the procedure of a screen display control process in the second embodiment.

FIG. 19 is a flowchart showing an example of the procedure of a screen display control process in the second embodiment. The screen display control process is a function formed in CPU 201A by CPU 201A of portable information device 200 in the second embodiment executing the screen display control program stored in flash memory 203 or CD-ROM 211A. Referring to FIG. 19, the process differs from the screen display control process in the first embodiment shown in FIG. 15 in that step S54 is changed to step S54A and that step S61 to step S63 are added in place of step S56. The other processing is the same as the processing shown in FIG. 15 and a description thereof is not repeated here.

In step S54A, it is determined whether the supplemental information extracted from the operation screen in step S53 indicates that the operation screen is a reference screen. If it indicates that the operation screen is a reference screen, the process proceeds to step S55. If not, the process proceeds to step S61.

In step S61, the operation screen (the first operation screen) displayed on display unit 206 is compared with the operation screen (the second operation screen) received in step S52. As a result of comparison, a section different from the operation screen (the first operation screen) displayed on the display unit 206, in the operation screen (the second operation screen) received in step S52, is extracted as a changed section. The changed section preferably has a predetermined size or larger. If there are a plurality of sections different from the operation screen (the first operation screen) displayed on display unit 206, in the operation screen (the second operation screen) received in step S52, the section having the largest size may be decided as a changed section.

In the next step S63, the decided changed section is displayed in full screen on display unit 206, and the process proceeds to step S57.

Portable information device 200 in the second embodiment functions as a remote operation device capable of remotely controlling MFP 100. If the second operation screen is received from MFP 100 in a state in which the first operation screen is displayed, portable information device 200 extracts a changed section of the second operation screen that is different from the first operation screen. If a changed section is extracted, portable information device 200 displays the changed section of the second screen in an enlarged size. The user therefore does not have to input an operation of enlarging the changed area when compared with a case where the entire second operation screen is displayed.

Portable information device 200 decides on part of the first operation screen as a display section in a state in which the first operation screen is displayed. Therefore, the first operation screen partially enlarged can be displayed.

Portable information device 200 decides a display section based on the operation input by the user. Therefore, the first operation screen partially enlarged, reduced, or changed can be displayed.

When supplemental information is received together with the second operation screen from MFP 100, portable information device 200 displays the entire second operation screen. Therefore, the entire operation screen received after the changed section is displayed can be displayed.

Portable information device 200 extracts an area in the second operation screen that is different from the first operation screen and has a predetermined size or larger, as a changed section. Therefore, the section to be displayed can be decided accurately.

Although remote control system 1 has been described in the foregoing embodiments, it is needless to say that the present invention can be understood as a screen transmission control method allowing MFP 100 to perform the screen transmission control process shown in FIG. 13 to FIG. 14 and FIG. 18, a screen transmission control program causing CPU 111 controlling MFP 100 to perform the screen transmission control method, a screen display control method allowing portable information device 200 to perform the screen display control process shown in FIG. 15 or FIG. 19, and a screen display control program causing CPU 201 of portable information device 200 to perform the screen display control method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control device remotely controlled by a remote operation device, comprising:
    an operation screen transmission portion to transmit an operation screen to the remote operation device; and
    a changed area decision portion to decide on an area in a second operation screen, that includes a portion different from a first operation screen, as a changed area, in a stage before the operation screen transmission portion transmits the second operation screen subsequently to the first operation screen,
    the operation screen transmission portion transmits to the remote operation device a command to display the decided changed area in a maximized size.

2. The remote control device according to claim 1, wherein
    the operation screen includes a basic screen and a composite screen in which a sub screen is superimposed on the basic screen, and
    if the second operation screen is the composite screen, the changed area decision portion decides on an area of the sub screen in the second operation screen as a changed area.

3. The remote control device according to claim 2, wherein even when the second operation screen is the composite screen, if the basic screen of the first operation screen differs from the basic screen of the second operation screen, the changed area decision portion does not decide on the area of the sub screen in the composite screen as a changed area.

4. The remote control device according to claim 2, wherein if the area of the sub screen is not decided as a changed area, the changed area decision portion decides on the entire second operation screen as a changed area.

5. The remote control device according to claim 2, wherein if the second operation screen includes the basic screen alone in a stage before the operation screen transmission portion transmits the second operation screen subsequently to the first operation screen, the changed area decision portion decides on the entire second operation screen as a changed area.

6. A remote operation device capable of remotely controlling a remote control device, comprising:
    an operation screen receiving portion to receive an operation screen from the remote control device;
    a display section decision portion to decide on at least part of the received operation screen as a display section to be displayed on a display unit;
    a display magnification decision portion to decide a display magnification, based on a size of the decided display section and a size of a display surface of the display unit; and
    a display control portion to display an image of the display section enlarged or reduced at the decided display magnification, on the display unit,
    the display section decision portion including
        a changed section extraction portion to extract a changed section in a second operation screen that is different from a first operation screen if the operation screen receiving portion receives the second operation screen in a state in which the first operation screen is displayed on the display unit, and
        a first decision portion to decide on the changed section in the second operation screen as a display section to be displayed on the display unit if the changed section extraction portion extracts the changed section.

7. The remote operation device according to claim 6, wherein the display section decision portion includes a second decision portion to decide on part of the first operation screen as a display section in a state in which the first operation screen is displayed on the display unit.

8. The remote operation device according to claim 7, further comprising an operation accepting portion to accept an operation by a user, wherein the second decision portion decides on the display section based on the operation accepted by the operation accepting portion.

9. The remote operation device according to claim 6, wherein the display section decision portion includes a third decision potion to decide on the entire second operation screen as the display section, irrespective of whether the changed section extraction portion extracts the changed section, if the operation screen receiving portion receives supplemental information together with the second operation screen.

10. The remote operation device according to claim 6, wherein the changed section extraction portion extracts an area in the second operation screen that is different from the first operation screen and has a predetermined size or larger, as a changed section.

11. A screen transmission control method performed by a remote control device remotely controlled by a remote operation device, the method comprising:
    an operation screen transmission step comprising transmitting an operation screen to the remote operation device; and
    a changed area decision step comprising deciding on an area in a second operation screen, that includes a portion different from a first operation screen, as a changed area, in a stage before the second operation screen is transmitted subsequently to the first operation screen in the operation screen transmission step,
    the operation screen transmission step comprising, if a changed area is decided in the changed area decision step, transmitting a command to display the changed area in an enlarged size.

12. A non-transitory computer-readable recording medium encoded with a screen transmission control program, the screen transmission control program causing a computer controlling the remote control device to perform the screen transmission control method of claim 11.

13. The non-transitory computer-readable recording medium encoded with the screen transmission control program according to claim 12, wherein
    the operation screen includes a basic screen and a composite screen in which a sub screen is superimposed on the basic screen, and
    the changed area decision step includes a step of deciding on an area of the sub screen in the second operation screen as a changed area if the second operation screen is the composite screen.

14. The non-transitory computer-readable recording medium encoded with the screen transmission control program according to claim 13, wherein even when the second operation screen is the composite screen, if the basic screen of the first operation screen differs from the basic screen of the second operation screen, the changed area decision step does not decide on the area of the sub screen in the composite screen as a changed area.

15. The non-transitory computer-readable recording medium encoded with the screen transmission control program according to claim 13, wherein the changed area decision step includes a step of deciding on the entire second operation screen as a changed area if the area of the sub screen is not decided as a changed area.

16. The non-transitory computer-readable recording medium encoded with the screen transmission control program according to claim 13, wherein the changed area decision step includes a step of deciding on the entire second operation screen as a changed area if the second operation screen includes the basic screen alone in a stage before the second operation screen is transmitted subsequently to the first operation screen in the operation screen transmission step.

17. A screen display control method performed by a remote operation device remotely controlling a remote control device, the method comprising:
an operation screen receiving step of receiving an operation screen from the remote control device;
a display section decision step of deciding on at least part of the received operation screen as a display section to be displayed on a display unit;
a display magnification decision step of deciding a display magnification, based on a size of the decided display section and a size of a display surface of the display unit; and
a display control step of displaying an image of the display section enlarged or reduced at the decided display magnification, on the display unit,
the display section decision step including
a changed section extraction step of extracting a changed section in a second operation screen that is different from a first operation screen if the second operation screen is received in the operation screen receiving step in a state in which the first operation screen is displayed on the display unit, and
a first decision step of deciding on the changed section in the second operation screen as a display section to be displayed on the display unit if the changed section is extracted in the changed section extraction step.

18. A non-transitory computer-readable recording medium encoded with a screen display control program, the screen display control program causing a computer controlling the remote operation device to perform the screen display control method of claim 17.

19. The non-transitory computer-readable recording medium encoded with a screen display control program according to claim 18, wherein the display section decision step includes a second decision step of deciding on part of the first operation screen as a display section in a state in which the first operation screen is displayed on the display unit.

20. The non-transitory computer-readable recording medium encoded with a screen display control program according to claim 19, wherein the screen display control program further causes the computer to perform an operation accepting step of accepting an operation by a user, wherein the second decision step decides on the display section based on the operation accepted in the operation accepting step.

21. The non-transitory computer-readable recording medium encoded with a screen display control program according to claim 18, wherein the display section decision step includes a third decision step of deciding on the entire second operation screen as the display section, irrespective of whether the changed section is extracted in the changed section extraction step, if supplemental information is received together with the second operation screen in the operation screen receiving step.

22. The non-transitory computer-readable recording medium encoded with a screen display control program according to claim 18, wherein the changed section extraction step includes a step of extracting an area in the second operation screen that is different from the first operation screen and has a predetermined size or larger, as a changed section.

23. The remote control device according to claim 1, wherein the operation screen transmission portion transmits the command to display the decided changed area in full screen.

24. The remote control device according to claim 1, wherein the operation screen transmission portion includes a supplemental information transmission portion to transmit the command to display the decided changed area in the maximized size, together with the second operation screen.

25. A screen transmission control program according to claim 12, wherein the operation screen transmission step transmits changed area information indicating a size and a position of the decided changed area and the command to display the changed area in the enlarged size.

26. A screen transmission control program according to claim 12, wherein the operation screen transmission step includes a supplemental information transmission step of, if a changed area is decided in the changed area decision step, transmitting supplemental information including the command to display the changed area in the enlarged size, together with the second operation screen.

27. A remote control device remotely controlled by a remote operation device, comprising:
a transmitter configured to transmit signals to the remote operation device; and a hardware processor configured to control the transmitter,
wherein the hardware processor is configured to:
cause the transmitter to transmit information regarding an operation screen to the remote operation device,
decide on an area, in a second operation screen, that includes a portion different from a first operation screen, as a changed area, in a stage before the transmitter transmits information regarding the second operation screen subsequently to information regarding the first operation screen, and
cause the transmitter to transmit a command to the remote operation device to display the decided changed area in a maximized size.

28. The remote control device according to claim 27, wherein the hardware processor causes the transmitter to transmit the command to display the decided changed area in full screen.

* * * * *